US012748481B2

(12) United States Patent
Park et al.

(10) Patent No.: US 12,748,481 B2
(45) Date of Patent: Sep. 29, 2026

(54) DISPLAY DEVICE AND METHOD FOR OPERATING THE SAME

(71) Applicant: LG Display Co., Ltd., Seoul (KR)

(72) Inventors: Sungchang Park, Paju-si (KR); Byunghan An, Gumi-si (KR); Hyungseob Lim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 173 days.

(21) Appl. No.: 18/396,200

(22) Filed: Dec. 26, 2023

(65) Prior Publication Data

US 2024/0221635 A1 Jul. 4, 2024

(30) Foreign Application Priority Data

Dec. 30, 2022 (KR) ........................ 10-2022-0191285

(51) Int. Cl.

| | |
|---|---|
| ***G06F 1/3234*** | (2019.01) |
| ***G06F 1/3287*** | (2019.01) |
| ***G09G 3/3225*** | (2016.01) |
| ***G09G 3/36*** | (2006.01) |

(52) U.S. Cl.

CPC .......... *G06F 1/3265* (2013.01); *G06F 1/3287* (2013.01); *G09G 3/3225* (2013.01); *G09G 3/3648* (2013.01); *G09G 2310/08* (2013.01); *G09G 2330/023* (2013.01); *G09G 2340/0435* (2013.01)

(58) Field of Classification Search

CPC .... G06F 1/3206; G06F 1/3218; G06F 1/3265; G06F 1/3287; G09G 3/3225; G09G 3/3648; G09G 2310/08; G09G 2330/023; G09G 2340/0435; G09G 3/3208; G09G 3/2022; G09G 2310/0264; G09G 2330/021; G09G 3/3291

See application file for complete search history.

(56) References Cited

U.S. PATENT DOCUMENTS

| | | | | |
|---|---|---|---|---|
| 10,867,566 B2 * | 12/2020 | Lee | G02F 1/13306 | |
| 12,334,011 B2 * | 6/2025 | Kwon | G09G 3/3233 | |
| 2009/0252140 A1 * | 10/2009 | Imaeda | H04B 7/0871 | 455/70 |
| 2011/0242088 A1 * | 10/2011 | Kim | H04L 69/14 | 345/92 |

(Continued)

FOREIGN PATENT DOCUMENTS

| | | |
|---|---|---|
| KR | 10-2018-0078858 A | 7/2018 |
| KR | 10-2021-0082994 A | 7/2021 |
| KR | 10-2277937 B1 | 7/2021 |

*Primary Examiner* — Thomas J. Cleary

(74) *Attorney, Agent, or Firm* — Fenwick & West LLP

(57) ABSTRACT

A display device capable of maximizing power consumption reduction of a digital logic circuit during low-speed operation and a method for operating the same are disclosed. The display device includes a display panel; and a plurality of source drivers configured to convert image data into data voltage and provide the data voltage to the display panel, wherein each of the plurality of source drivers includes a reception circuit configured to reconstruct at least one of the image data, control data, and a clock from a data packet received from a timing controller, wherein in a variable refresh rate mode operation, the display device is configured to activate the reception circuit during a refresh frame and to deactivate the reception circuit during a skip frame.

16 Claims, 13 Drawing Sheets

(56) References Cited

U.S. PATENT DOCUMENTS

| | | | | |
|---|---|---|---|---|
| 2014/0320465 | A1* | 10/2014 | Oh | G09G 3/3688 345/204 |
| 2017/0322612 | A1* | 11/2017 | Beuchat | G06F 1/3243 |
| 2018/0122294 | A1* | 5/2018 | Do | G09G 5/008 |
| 2018/0190238 | A1* | 7/2018 | Park | G09G 5/008 |
| 2019/0122623 | A1* | 4/2019 | Lee | G09G 3/3614 |
| 2021/0201757 | A1* | 7/2021 | Kim | G09G 3/3225 |
| 2021/0280113 | A1* | 9/2021 | Ahn | G09G 3/20 |
| 2023/0081076 | A1* | 3/2023 | Lim | G09G 3/3688 345/212 |
| 2025/0273131 | A1* | 8/2025 | Park | G09G 3/32 |

* cited by examiner

DISPLAY DEVICE AND METHOD FOR OPERATING THE SAME

CROSS-REFERENCE TO RELATED APPLICATION

This application claims priority from Republic of Korea Patent Application No. 10-2022-0191285 filed on Dec. 30, 2022 in the Korean Intellectual Property Office, the contents of which are herein incorporated by reference in their entirety.

BACKGROUND

Technical Field

The present disclosure relates to a display device, and more particularly, to a display device capable of reducing power consumption of a digital logic circuit during low-speed operation and a method for operating the same.

Background Art

As the information society develops, demand for a display device for displaying an image is increasing in various forms. In this response, various display devices such as a liquid crystal display device and an organic light-emitting display device are being utilized.

The organic light-emitting display device does not require a separate light source and thus is in the limelight as means for vivid color display. The organic light-emitting display device uses an organic light-emitting diode as a self-light-emitting element, and thus has advantages such as fast response speed, high contrast ratio, high light-emitting efficiency, high luminance, and wide viewing angle.

SUMMARY

A MTO (Multi TFT OLED) panel has a structure capable of low-speed operation, and operates in a refresh frame and a skip frame separately during low-speed operation. Unlike the refresh frame, in the skip frame, sampling is not performed and only an on-bias stress voltage is applied to a driving transistor. The MTO panel is advantageous in low-frequency operation for displaying a still image and has an advantage of reducing power consumption.

Because the sampling is not performed in the skip frame, an operation of a transmission circuit (EPI TX) of a timing controller and an operation of a reception circuit (D-IC RX) of a source driver are unnecessary. However, a display device according to a prior art has a problem in that even in the skip frame, the transmission circuit and the reception circuit as digital logic circuits of the timing controller and the source driver, respectively consume power.

Thus, the inventors of the present disclosure have invented a display device capable of reducing the power consumption of the digital logic circuit during low-speed operation.

A technical purpose according to one embodiment of the present disclosure is to provide a display device capable of maximizing power consumption reduction of the digital logic circuit during low-speed operation, and a method for operating the same.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A display device according to one embodiment of the present disclosure includes a display panel: and a plurality of source drivers configured to convert image data into data voltage and provide the data voltage to the display panel, wherein each of the plurality of source drivers includes a reception circuit configured to reconstruct at least one of the image data, control data, and a clock from a data packet received from a timing controller, wherein in a VRR (variable refresh rate) mode operation, the display device is configured to activate the reception circuit during a refresh frame and to deactivate the reception circuit during a skip frame.

A method for operating a display device according to one embodiment of the present disclosure is provided, wherein the display device includes: a display panel: and a plurality of source drivers configured to convert image data into data voltage and provide the data voltage to the display panel, wherein each of the plurality of source drivers includes a reception circuit configured to reconstruct at least one of the image data, control data, and a clock from a data packet received from a timing controller, wherein the method comprises: in a VRR (Variable Refresh Rate) mode operation, activating the reception circuit during a refresh frame; and deactivating the reception circuit during a skip frame.

According to one embodiment of the present disclosure, there is provided a method for operating a display device, the display device including a display panel, the method comprising: converting image data into data voltage, and providing the data voltage to the display panel; and in a variable refresh rate mode operation, enabling during a refresh frame, and disabling during a skip frame, reconstruction of at least one of the image data, control data, and a clock from a data packet received from a timing controller.

The display device and the method of operating the same according to the embodiments may maximize the power consumption reduction of the digital logic circuit during the low-speed operation.

Further, maximizing the power consumption reduction allows the low-power operation.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

DETAILED DESCRIPTION

Figure 1:
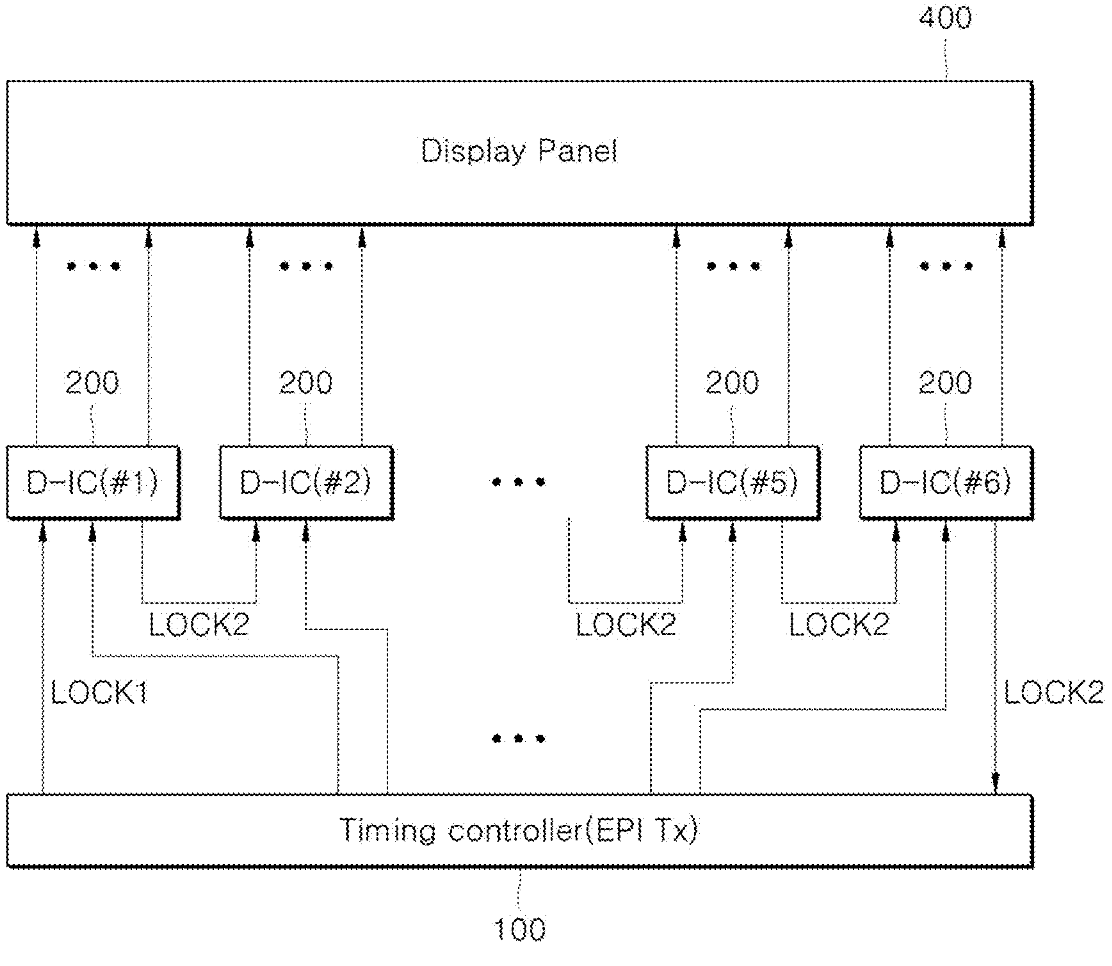
FIG. 1 is a block diagram of a display device according to one embodiment.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc., disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting to the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description section. Therefore, the terms used in the description below should be understood based on not simply the name of the terms, but the meaning of the terms and the contents throughout the Detailed Description.

In description of flow of a signal, for example, when a signal is delivered from a node A to a node B, this may include a case where the signal is transferred from the node A to the node B via another node unless a phrase 'immediately transferred' or 'directly transferred' is used.

Hereinafter, a display device according to some embodiments and a method for operating the same will be described. Prior to describing the embodiments, the meaning of terms used in the present disclosure is defined.

As used herein, a frame may be a concept of a temporal period. In some cases, the frame may have meanings such as an image or an operation mode.

As used herein, a refresh frame may be defined as a period of initializing a pixel circuit and programming a data voltage to refresh an image of a display panel. The refresh frame may be divided into a stress period, an initialization period, and a sampling period.

As used herein, a skip frame may be defined as a period for which an image of a display panel is maintained by maintaining a level of a data voltage applied to a pixel circuit. In one example, the skip frame may include a stress period.

FIG. 1 is a block diagram of a display device according to one embodiment.

Referring to FIG. 1, the display device includes a timing controller 100 and a plurality of source drivers 200.

The timing controller 100 is connected to each of the source drivers 200 in a point-to-point manner. The timing controller 100 provides a data packet EPI including image data, control data and a clock to each of the source drivers 200.

Each of the source drivers 200 receives the data packet EPI from the timing controller 100, and reconstructs the image data, the control data, and the clock from the data packet EPI. Then, each of the source drivers 200 converts the image data as a digital signal into a data voltage as an analog signal, and supplies the data voltage to data lines of a display panel 400.

A first source driver D-IC #1 may receive a lock signal LOCK1 from the timing controller 100 and transmit a lock signal LOCK2 to a second source driver D-IC #2 adjacent thereto. The first source driver D-IC #1 may play a role of notifying the adjacent source driver thereto whether only the clock is included in the data packet EPI or the clock and the image data are included in the data packet EPI.

In one example, upon receiving the data packet EPI while receiving the lock signal at a low logic level, each of all of the source drivers 200 may reconstruct the clock from the data packet EPI and perform clock training. For example, upon receiving the lock signal as at a low logic level, the first source driver D-IC #1 may reconstruct the clock from the data packet EPI received from the timing controller 100 and generate an internal clock. When a phase and a frequency of the internal clock are fixed via the clock training, the first source driver D-IC #1 may transmit the lock signal LOCK2 to the adjacent second source driver D-IC #2 thereto.

In this manner, a last sixth source driver D-IC #6 may receive the lock signal LOCK2 of a high logic level from a fifth source driver D-IC #5 adjacent thereto. When the phase and the frequency of the internal clock are fixed via the clock training, the last sixth source driver D-IC #6 may transmit the lock signal LOCK2 of the high logic level to the timing controller 100. This last source driver may play a role of notifying the timing controller 100 of a signal indicating that all source drivers are ready to receive the image data.

Upon receiving the lock signal at the high logic level from the sixth source driver D-IC #6, the timing controller 100 may determine that all source drivers 200 are ready to receive the data. Then, the timing controller 100 may provide the data packet including the clock, the image data, and the control data to all source drivers 200.

FIG. 1 illustrates six source drivers 200, for example. However, the present disclosure is not limited thereto. The number of source drivers may be determined according to a size or a resolution of the display panel 400.

Further, the timing controller 100 is connected to one of the plurality of source drivers 200 and transmits the lock signal LOCK1 thereto. Adjacent ones of the plurality of source drivers 200 are connected to each other such that one thereof transmits the lock signal LOCK2 to the other thereof. Further, the last source driver is connected to the timing controller 100 and thus transmits lock signal LOCK2 to the timing controller 100.

The timing controller 100 may transmit the data packet including only the clock to the source drivers 200 for clock synchronization with the source drivers 200. Each source driver 200 may reconstruct the clock from the data packet. When phases thereof coincide with each other via the clock training, each source driver 200 may switch the lock signal LOCK2 from the low logic level to the high logic level.

Upon receiving the lock signal LOCK2 at the high logic level, the timing controller 100 may provide the data packet EPI including the image data, the control data, and the clock to each of the source drivers 200. Then, each source driver 200 may reconstruct the image data, the control data and the clock from the data packet EPI, and convert the image data into digital data, and output the digital data to the data lines of the display panel.

In one example, the timing controller 100 may include a transmission circuit that generates the data packet EPI including the image data, the control data, and the clock, and transmits the data packet EPI to each source driver 200. The source driver 200 may include a reception circuit that reconstructs the image data, the control data, and the clock from the data packet EPI. Each of the transmission circuit and the reception circuit may be embodied as a logic circuit that processes a digital signal.

Moreover, the display device may further include a gate driver providing scan signals and an emission signal to gate lines of the display panel. The gate driver may provide at least one of the scan signals and the emission signal to the gate lines of the display panel according to the refresh frame or the skip frame.

In FIG. 1, it is shown that a signal line that transmits the lock signal between the source drivers 200 is disposed outside the display panel 400. However, the present disclosure is not limited thereto. The signal line delivering the lock signal may be connected to a next source driver via the display panel 400.

Figure 2:
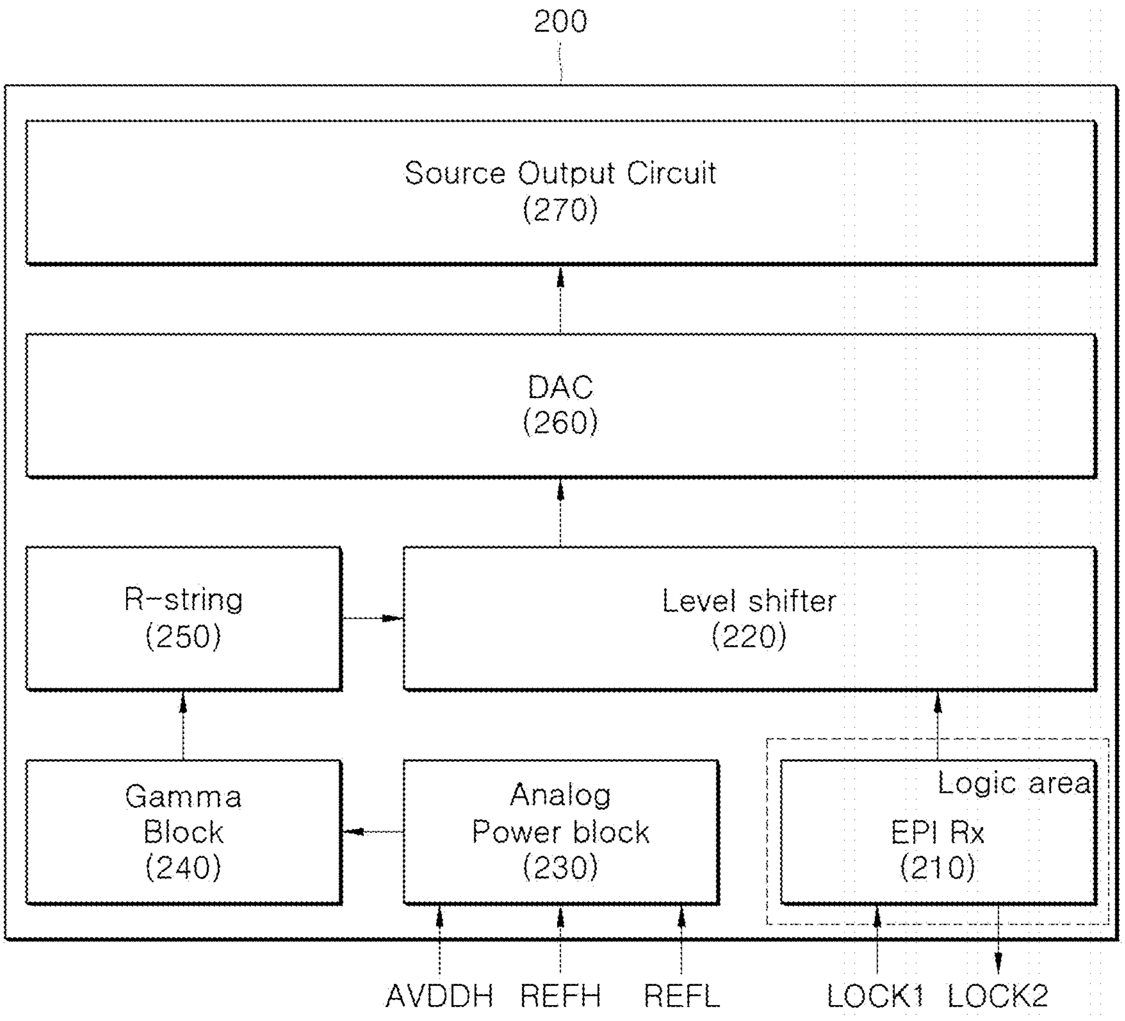
FIG. 2 is a block diagram of a source driver in a display device according to one embodiment.

FIG. 2 is a block diagram of a source driver in a display device according to one embodiment.

Referring to FIG. 2, the source driver 200 may include a reception circuit 210, a level shifter 220, an analog power block 230, a gamma block 240, a resistor string 250, a digital-to-analog converter 260, and a source output circuit 270.

The reception circuit 210 may perform clock training for synchronization with the timing controller 100. When synchronization has been achieved, the reception circuit 210 may reconstruct the image data, the control data, and the clock from the data packet EPI, and provide the image data, the control data, and the clock to the level shifter 220.

The analog power block 230 may receive analog power voltage AVDD, high-potential reference voltage REFH, and low-potential reference voltage REFL from an external power circuit, and may provide the analog power voltage AVDD, the high-potential reference voltage REFH, and the low-potential reference voltage REFL to the gamma block 240. The gamma block 240 may generate a gamma reference voltage for generating a gray-scale voltage and provide the gamma reference voltage to the resistor string 250. The resistor string 250 may generate the gamma gray-scale voltages based on the gamma reference voltage and may provide the generated gamma gray-scale voltages to the level shifter 220 or the digital-to-analog converter 260.

The level shifter 220 may include a shift register, may latch the image data, and may sequentially provide the latched image data to the digital-to-analog converter 260. The digital-to-analog converter 260 may select a gray-scale voltage corresponding to the image data from among the gray-scale voltages and provide the selected gray-scale voltage to the source output circuit 270. The source output circuit 270 may include an output buffer circuit and may buffer the gray-scale voltage and output the same as a data voltage to the data lines of the display panel.

Figure 3:
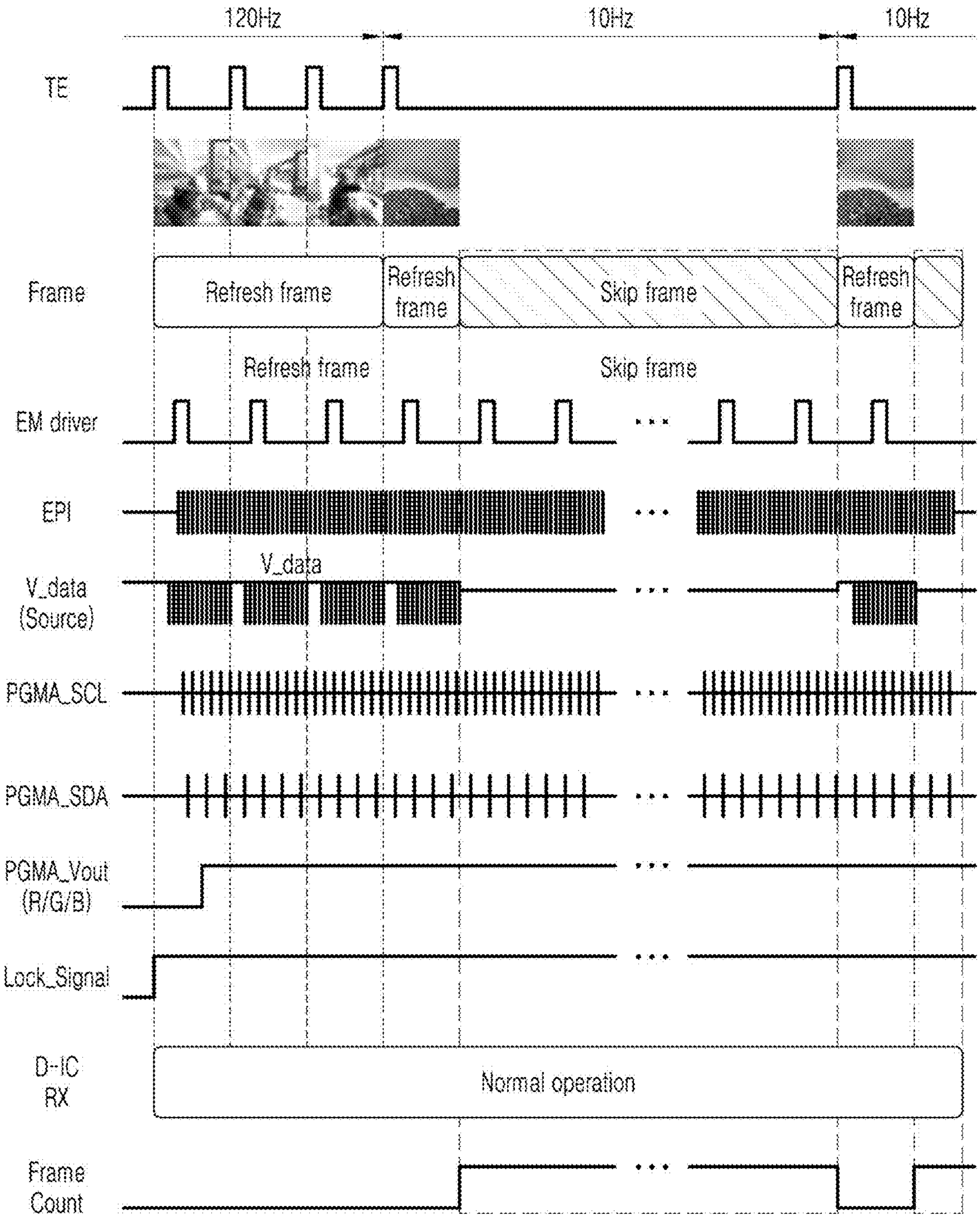
FIG. 3 is a timing diagram illustrating an operation of a display device according to one embodiment.

FIG. 3 is a timing diagram illustrating an operation of a display device according to one embodiment.

Referring to FIG. 3, the display device may operate in the refresh frame and the skip frame separately during variable refresh rate (VRR) mode operation.

In one example, the display device may operate in the refresh frame at an operating frequency of 120 Hz, and may operate in the refresh frame and in the skip frame separately during low-speed operation at an operating frequency of 10 Hz.

The display device controls an operating state of the timing controller 100 based on the operation mode. During the VRR mode operation, the timing controller 100 receives the image data and performs a calculation operation during the refresh frame during which the analog signal is output to the display panel, and the timing controller 100 does not perform the image data reception and the calculation operation during the skip frame during the analog signal is not output to the display panel.

In this way, during the VRR mode operation, the timing controller 100 also operates according to the operating frequency as the display panel operates. Thus, digital power consumed by the timing controller 100 may be reduced.

The operating frequency in the VRR mode operation is preferably a divisor of a frequency of an input clock. For example, when the input frequency is 60 Hz, the operating frequency during the VRR mode operation may be 30 Hz, 20 Hz, 15 Hz, 12 Hz, 10 Hz, 6 Hz, 5 Hz, 4 Hz, 3 Hz, 2 Hz, or 1 Hz.

When the display device operates in the VRR mode, refresh periods for which the image is refreshed in the display panel and skip periods for which the image is not refreshed are alternated with each other. As the operating frequency is smaller, the refresh period is smaller and the skip period is larger.

Figure 4:
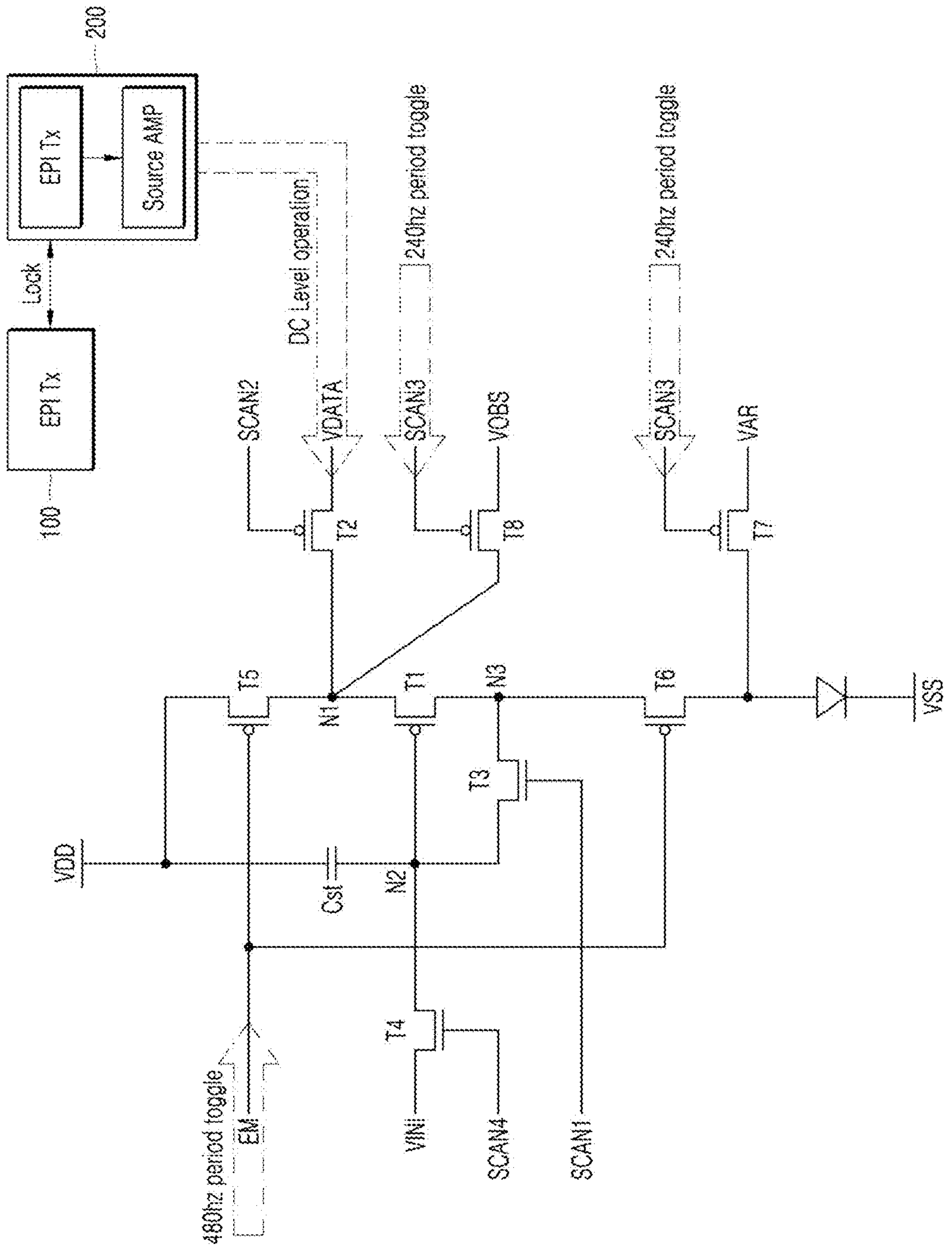
FIG. 4 shows an operation of a pixel circuit in a skip frame in a display device according to one embodiment.

FIG. 4 shows an operation of a pixel circuit in the skip frame in a display device according to one embodiment.

Referring to FIG. 3 and FIG. 4, the pixel circuit includes a light-emitting element, a first transistor T1, a storage capacitor Cst, a second transistor T2, a third transistor T3, a fourth transistor T4, a fifth transistor T5, a sixth transistor T6, a seventh transistor T7 and an eighth transistor T8.

The light-emitting element emits light based on driving current. The light-emitting element may be embodied as an organic light-emitting diode which may include an anode electrode, a cathode electrode, and an organic light-emitting layer between the anode electrode and the cathode electrode. The anode electrode is connected to the first transistor T1 via the sixth transistor T6, and the cathode electrode is connected to a low-potential voltage VSS.

The first transistor T1 controls a magnitude of the driving current that causes the light-emitting element to emit light. The first transistor T1 is referred to as a driving transistor T1. The driving transistor T1 includes a gate electrode, a source electrode and a drain electrode. The source electrode corresponds to a first node N1, the gate electrode corresponds to a second node N2, and the drain electrode corresponds to a third node N3. A data voltage VDATA is applied to the source electrode of the driving transistor T1, and the anode electrode of the light-emitting element is connected to the drain electrode of the driving transistor T1.

The third transistor T3 is connected to and disposed between the gate electrode and drain electrode of the driving transistor T1. Further, the third transistor T3 is connected to and disposed between the storage capacitor Cst and the drain electrode of the driving transistor T1. The third transistor T3 connects the gate electrode and the drain electrode of the driving transistor T1 to each other, and connects the storage capacitor Cst and the drain electrode of the driving transistor T1 to each other, in response to a first scan signal SCAN1.

The second transistor T2 is connected to and disposed between the data voltage VDATA and the source electrode of the driving transistor T1. The second transistor T2 applies the data voltage VDATA to the source electrode of the driving transistor T1 in response to a second scan signal SCAN2.

The fifth transistor T5 is connected to and disposed between a power supply voltage VDD and the source electrode of the driving transistor T1. The fifth transistor T5 applies the power voltage VDD to the source electrode of the driving transistor T1 in response to an emission signal EM.

The sixth transistor T6 is connected to and disposed between the drain electrode of the driving transistor T1 and the anode electrode of the light-emitting element. The sixth transistor T6 generates a current path between the driving transistor T1 and the light-emitting element in response to the emission signal EM. Depending on a current intensity of the current path, luminance or a gray-scale of the light-emitting element is determined. The current intensity of the current path is determined based on the data voltage VDATA corresponding to the image data.

The fourth transistor T4 is connected to and disposed between the gate electrode of the driving transistor T1 and a first initialization voltage VINI. Then, the fourth transistor T4 is connected to and disposed between the storage capacitor Cst and the first initialization voltage VINI. The fourth transistor T4 applies the first initialization voltage VINI to the gate electrode of the driving transistor T1 and an electrode of the storage capacitor Cst in response to a fourth scan signal SCAN4.

One electrode of the storage capacitor Cst is coupled to the power supply voltage VDD and the other electrode thereof is connected to the gate electrode of the driving transistor T1 and the fourth transistor T4. The storage capacitor Cst samples the data voltage VDATA under the operation of the driving transistor T1 and the third transistor T3. Further, the storage capacitor Cst is initialized with the first initialization voltage VINI under the operation of the fourth transistor T4.

The seventh transistor T7 is connected to and disposed between the anode electrode of the light-emitting element and a second initialization voltage VAR. The seventh transistor T7 applies the second initialization voltage VAR to the anode electrode of the light-emitting element in response to a third scan signal SCAN3.

The eighth transistor T8 is connected to and disposed between the source electrode of the driving transistor T1 and an on-bias stress voltage VOBS. The eighth transistor T8 applies the on-bias stress voltage VOBS to the source electrode of the driving transistor T1 in response to the third scan signal SCAN3.

The seventh transistor T7 and the eighth transistor T8 may operate in response to the third scan signal SCAN3 during an initialization period of the refresh frame and a stress period of the skip frame.

In the MTO (Multi TFT OLED) panel structure, each of the driving transistor T1, the second transistor T2, the fifth transistor T5, the sixth transistor T6, the seventh transistor T7, and the eighth transistor T8 may be embodied as a PMOS transistor, while each of the third transistor T3 and the fourth transistor T4 may be embodied as an NMOS transistors.

In one example, the first scan signal SCAN1, the second scan signal SCAN2, the third scan signal SCAN3, the fourth scan signal SCAN4, and the emission signal EM may be generated from at least one gate driver, and may be provided to each of the pixel circuits of the display panel.

The MTO (Multi TFT OLED) panel has a structure capable of low-speed operation, and operates in a refresh frame and a skip frame separately during low-speed operation. Unlike the refresh frame, in the skip frame, sampling is not performed and only an on-bias stress voltage is applied to a driving transistor. The MTO panel is advantageous in low-frequency operation for displaying a still image and has an advantage of reducing power consumption.

Because the sampling is not performed in the skip frame, an operation of the transmission circuit of the timing controller 100 and an operation of the reception circuit of the source driver 200 are unnecessary. That is, an operation of generating the data packet EPI including the image data, the control data, and the clock, and an operation of reconstructing the image data, the control data, and the clock from the data packet EPI are unnecessary.

Figure 5:
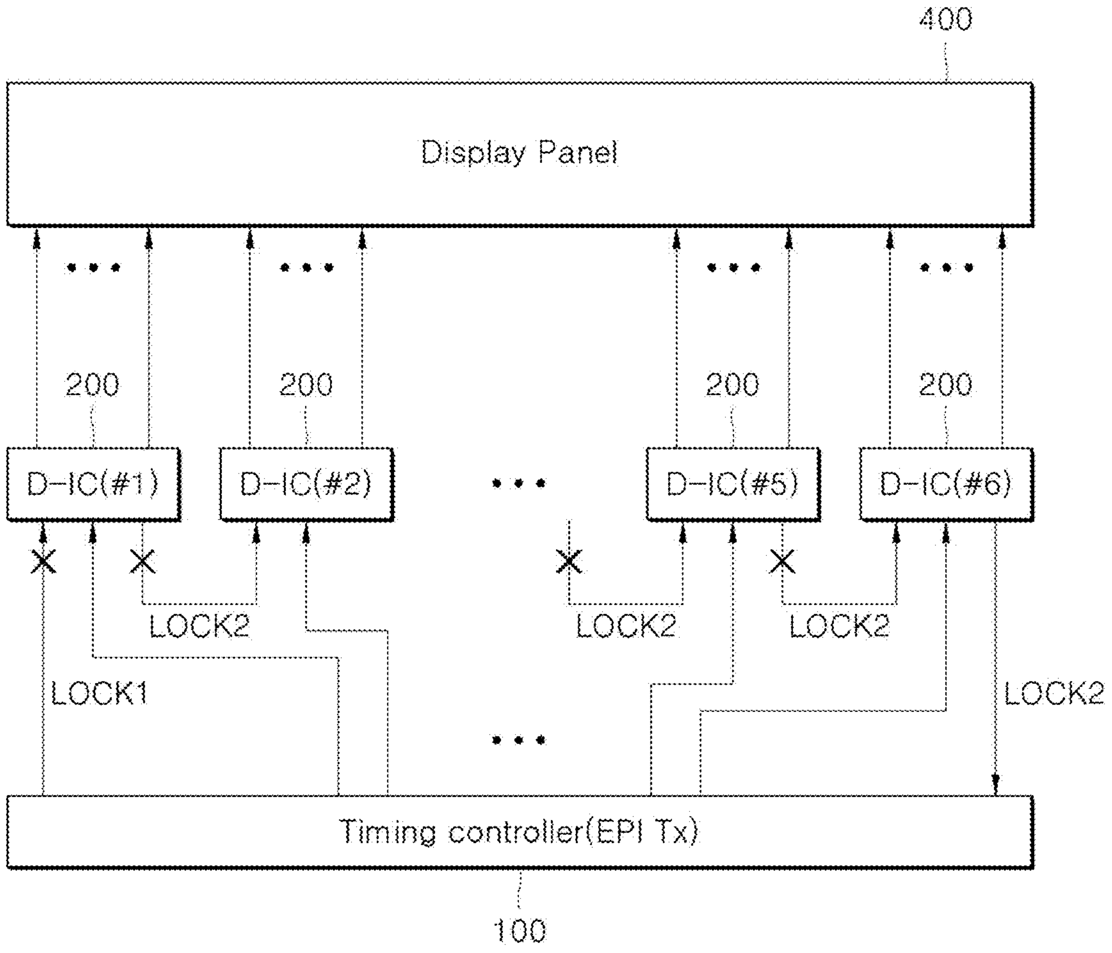
FIG. 5 is a block diagram showing an operation in a skip frame in a display device according to another embodiment.

FIG. 5 is a block diagram showing an operation in a skip frame in a display device according to another embodiment.

As shown in FIG. 5, in the display device, the timing controller 100 outputs a lock signal at a low logic level to the source drivers 200 in the skip frame during the VRR mode operation. In FIG. 5, a mark 'X' on a line connected to and disposed between the timing controller 100 and the source driver 200 and carrying the lock signal LOCK1 indicates that the lock signal LOCK1 is not output or the lock signal LOCK1 is output at a low logic level. A mark 'X' on a line connected to and disposed between the adjacent source drivers 200 and carrying the lock signal LOCK2 indicates that the lock signal LOCK2 is not output or the lock signal LOCK2 is output at a low logic level.

In one example, when the data is ready to be transmitted and received between the source driver and the timing controller, the lock signal may transition to a high logic level. To the contrary, when the data is not ready to be transmitted and received between the source driver and the timing controller, the lock signal may transition to a low logic level.

In one example, when the phase and the frequency of the internal clock are fixed via the clock training, the source driver 200 may transmit the lock signal LOCK2 to the source driver adjacent thereto. The last source driver receives the lock signal LOCK2 of a high logic level from the adjacent source driver thereto. Then, when the phase and the frequency of the internal clock are fixed via the clock training, the lock signal LOCK2 of a high logic level may be transmitted to the timing controller 100.

When the phase and the frequency of the internal clock are fixed, each of all source drivers 200 may receive the data packet EPI from the timing controller 100, and may reconstruct the image data and the control data from the data packet EPI.

Further, each of all source drivers 200 may convert the image data into the digital data VDATA using the gray-scale voltage corresponding to the image data and provide the digital data VDATA to the pixel circuit of the display panel 400.

In the display device according to the present embodiment, the lock signal at the low logic level may be communicated between the timing controller 100 and the source drivers 200 in the skip frame during the VRR mode operation, thereby deactivating the digital logic circuit. In one example, the display device may deactivate the transmission circuit of the timing controller 100 and the reception circuit of the source driver as the digital logic circuits during the skip frame.

Figure 6:
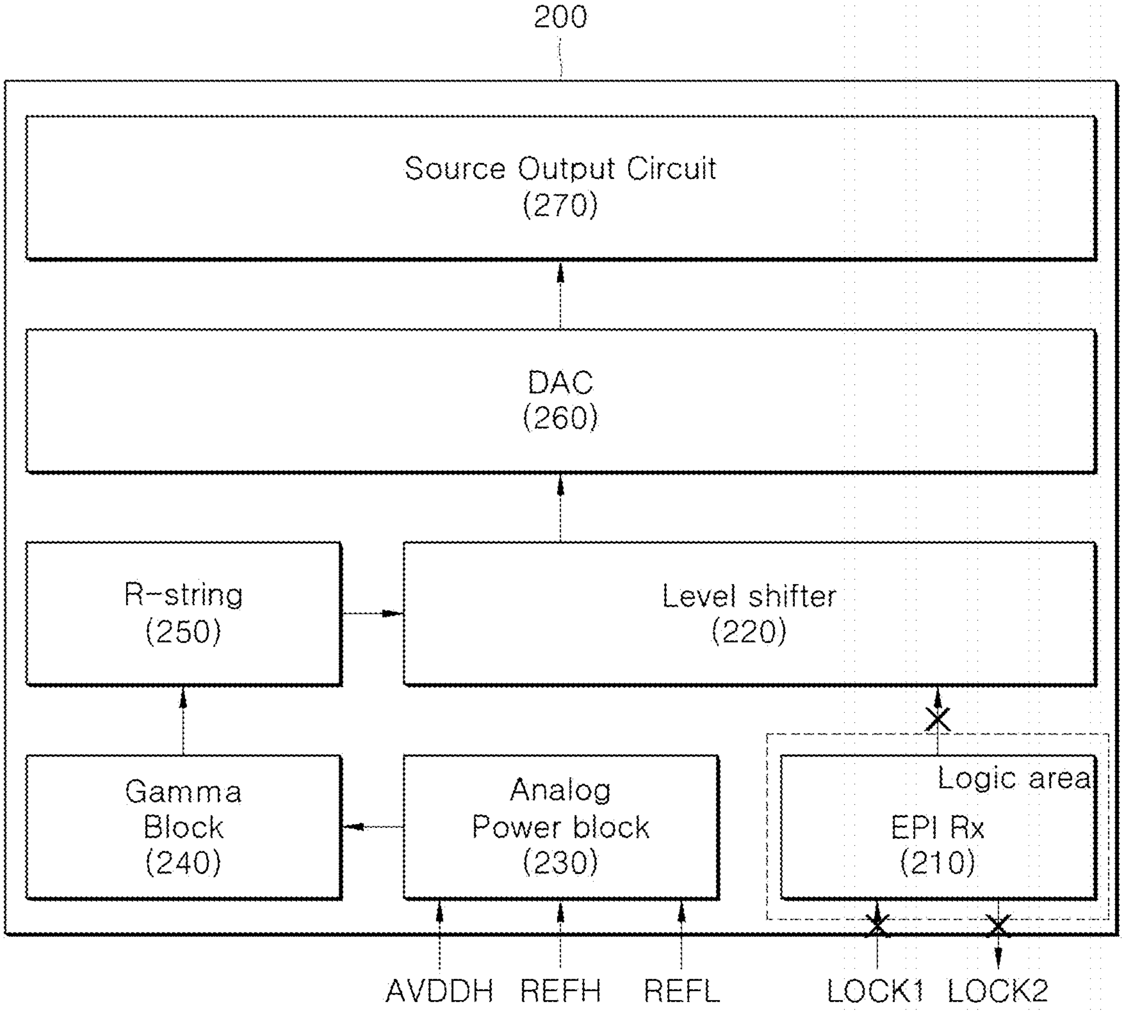
FIG. 6 is a block diagram of a source driver showing an operation in a skip frame in a display device according to another embodiment.

FIG. 6 is a block diagram of a source driver showing an operation in a skip frame in a display device according to another embodiment.

Referring to FIG. 6, the reception circuit 210 of the source driver 200 becomes deactivated during the skip frame. In one example, the reception circuit 210 may be deactivated in response to the lock signal LOCK1 at the low logic level, and provide the lock signal LOCK2 of the low logic level to an adjacent source driver thereto or the timing controller 100.

Then, in the skip frame, the level shifter 220, the analog power block 230, the gamma block 240, the resistor string 250, the digital-to-analog converter 260, and the source output circuit 270 may be maintained at an active state.

The level shifter 220 may provide the digital-to-analog converter 260 with the image data latched in the shift register during the skip frame. In one example, the level shifter 220 may provide the digital-to-analog converter 260 with the image data latched at a last time during the refresh frame period.

The digital-to-analog converter 260 may select a gray-scale voltage corresponding to the image data latched at the last time during the refresh frame period and provide the selected gray-scale voltage to the source output circuit 270. The source output circuit 270 may output the gray-scale voltage as the data voltage to the data lines of the display panel.

In this way, the source driver 200 may deactivate the reception circuit 210 as the digital logic circuit during the skip frame, and converts the last image data of the refresh frame period into an analog data voltage and outputs the same to the display panel.

Figure 7:
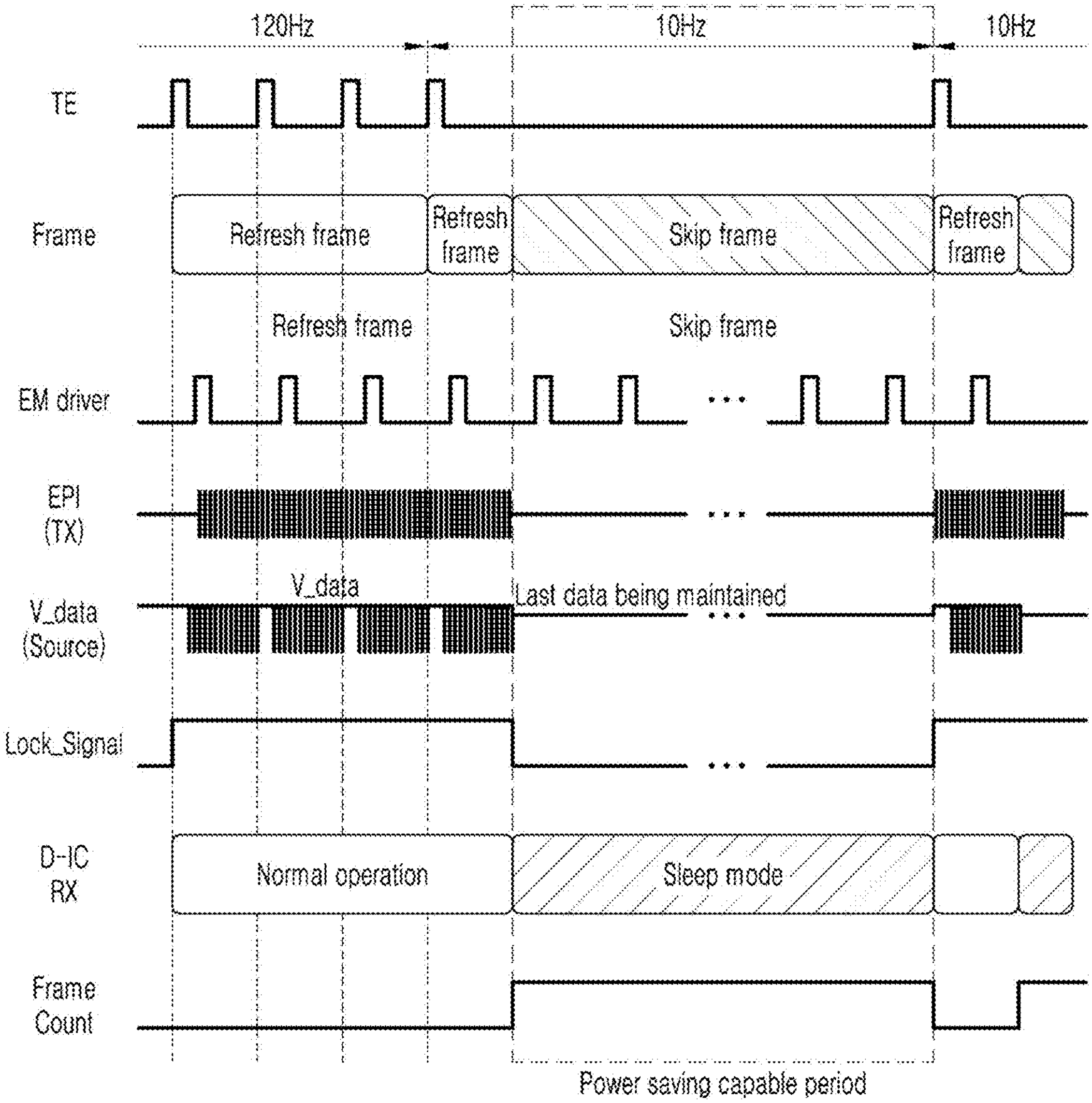
FIG. 7 is a timing diagram illustrating an operation of a display device according to another embodiment.

FIG. 7 is a timing diagram illustrating an operation of a display device according to another embodiment.

Referring to FIG. 7, during the skip frame in the low-speed operation at an operating frequency of 10 Hz, the display device deactivates the transmission circuit so that the data packet EPI from the timing controller 100 is not output to the source driver, and deactivates the reception circuit of the source driver 200 such that the reception circuit does not reconstruct the image data from the data packet EPI, and the output of the source driver 200 is maintained at a level of the data voltage output at a last time during the refresh frame.

Further, the display device may transition the lock signal to the low logic level as soon as the refresh frame is changed to the skip frame. Due to the transition of the lock signal to the low logic level, the transmission circuit of the timing controller 100 and the reception circuit of the source driver 200 may enter a sleep mode.

In this way, the digital logic circuit enters the sleep mode during the skip frame, such that the display device does not perform unnecessary logic operations, such as the clock training, the data packet transmission, and the reconstruction operation of the data from the data packets, thereby reducing power consumption.

Figure 8:
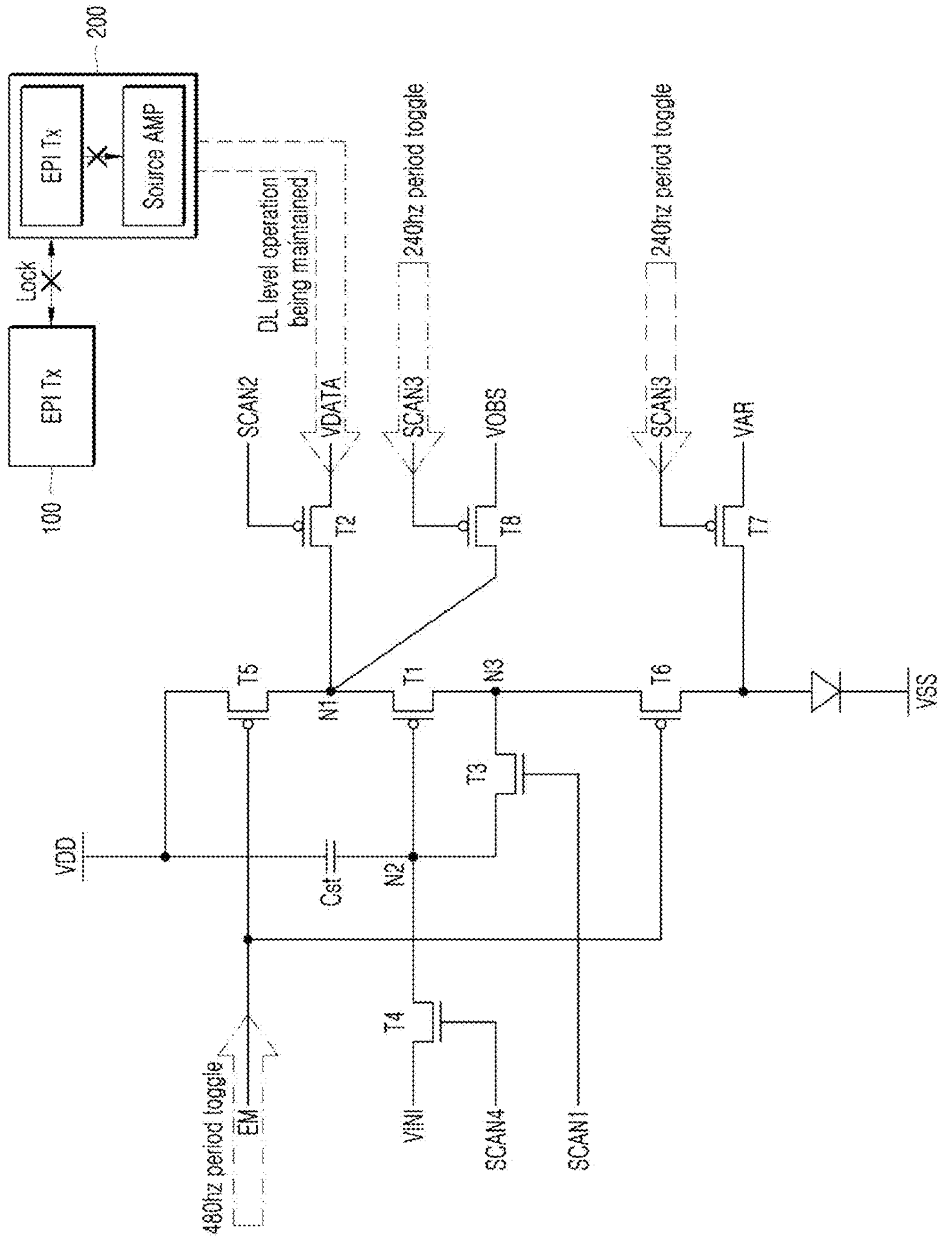
FIG. 8 shows the operation of a pixel circuit in a skip frame in a display device according to another embodiment.

FIG. 8 shows an operation of a pixel circuit in a skip frame in a display device according to another embodiment.

Referring to FIG. 8, during the stress period of the skip frame, the pixel circuit may apply the on-bias voltage VOBS to the source electrode of the driving transistor T1, and may apply the second initialization voltage VAR to the anode electrode of the light-emitting element.

In one example, the eighth transistor T8 may apply the on-bias voltage VOBS to the source electrode of the driving transistor T1 in response to the third scan signal SCAN3 during the stress period of the skip frame. The seventh transistor T7 may apply the second initialization voltage VAR to the anode electrode of the light-emitting element in response to the third scan signal SCAN3 during the stress period of the skip frame.

The pixel circuit may apply the data voltage VDATA to the driving transistor T1 in the skip frame. In one example, the second transistor T2 may supply the data voltage VDATA to the source electrode of the driving transistor T1 in response to the second scan signal SCAN3 in the skip frame.

At this time, in some embodiments, the lock signal does not communicate between the timing controller 100 and the source driver 200. Alternatively, the lock signal at the low logic level communicates between the timing controller 100 and the source driver 200, so that the transmission circuit and the reception circuit may be switched to the inactive state. At the same time, the source driver 200 may maintain the output signal at the level of the last data voltage VDATA of the refresh frame.

Figure 9:
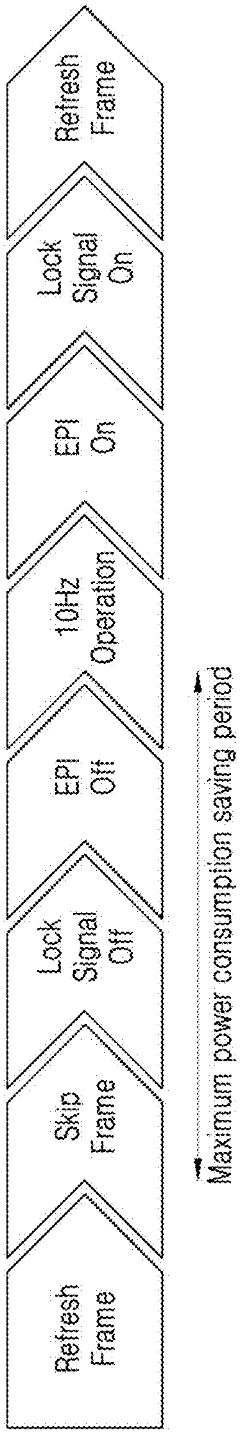
FIG. 9 shows a sequence of a variable refresh rate (VRR) mode operation in a display device according to another embodiment.

FIG. 9 shows a sequence during VRR mode operation in a display device according to another embodiment.

Referring to FIG. 9, the display device refreshes the image of the display panel in the refresh frame during VRR mode operation. Then, the display device enters the skip frame and thus maintains the image of the display panel.

At this time, the display device outputs the lock signal at an off level or a low logic level, and applies the on-bias stress voltage to the pixel circuit during the stress period of the skip frame operating at a low frequency of 10 Hz.

Then, the display device counts a time during the skip frame and activates the transmission circuit of the timing controller when the time reaches a reference time.

The transmission circuit transmits the data packet including the clock to the reception circuit of the source driver.

When the phase and the frequency of the internal clock are fixed via the clock training, the reception circuit outputs the lock signal at an on level or a high logic level.

The display device enters the refresh frame when the lock signal transitions to the on level or the high logic level.

During the refresh frame, the transmission circuit of the timing controller transmits the data packet, including the image data, the control data, and the clock, to the reception circuit of the source driver, and then, the reception circuit of the source driver reconstructs the image data, the control data, and the clock from the data packet.

During the refresh frame, the source driver refreshes the image of the display panel by converting the image data into the data voltage and supplying the data voltage to the pixel circuits of the display panel.

Figure 10:
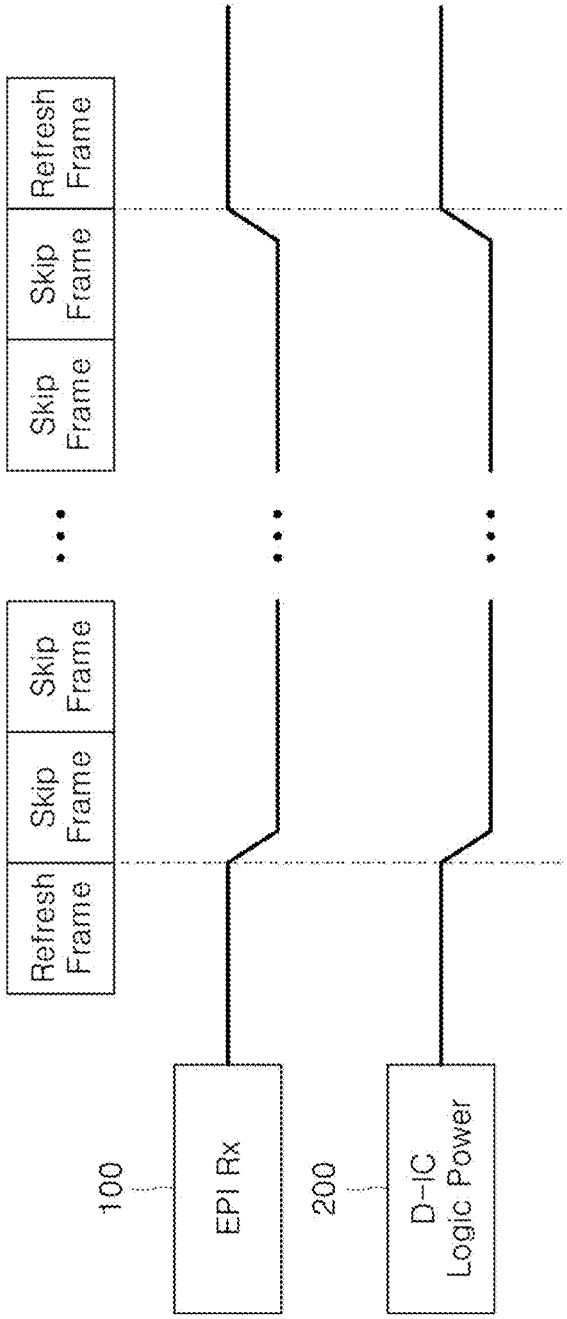
FIG. 10 is a diagram illustrating reduction of power consumption during a skip frame in a display device according to another embodiment.

FIG. 10 is a diagram illustrating reduction of power consumption during a skip frame in a display device according to another embodiment.

Referring to FIG. 10, during the skip frame, the data packet is not supplied to the source driver, and logic power is not supplied to the reception circuit of the source driver. Thus, the power consumption may be reduced.

Figure 11:
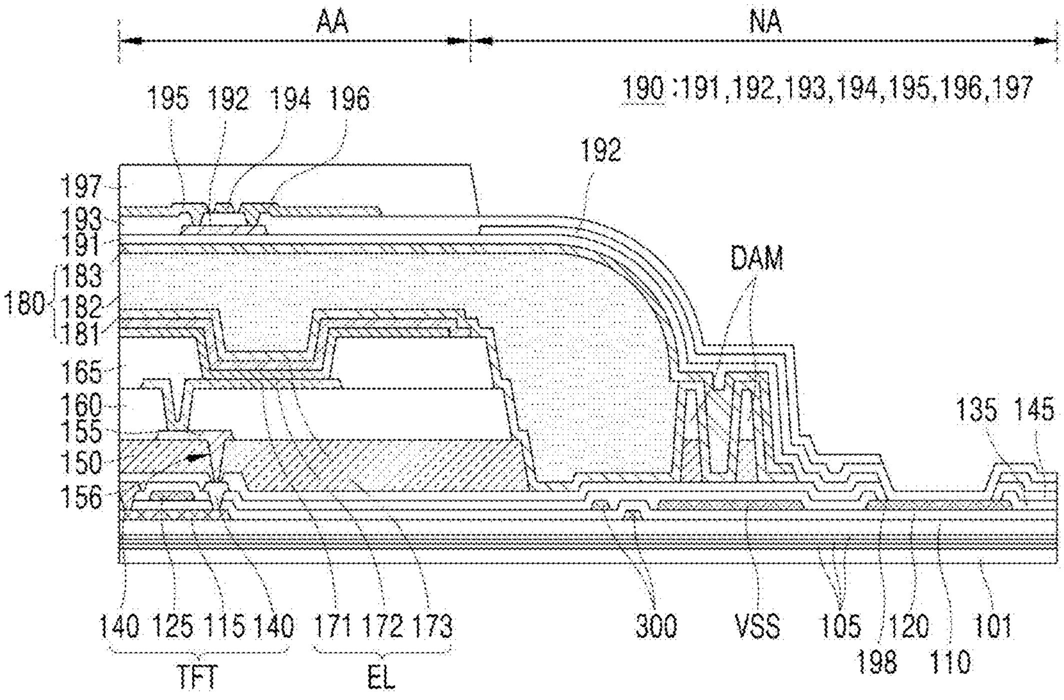
FIG. 11 is a cross-sectional view showing a stack structure of a display device according to one embodiment.

FIG. 11 is a cross-sectional view showing a stack structure of a display device according to one embodiment.

Referring to FIG. 11, a thin-film transistor TFT for driving the light-emitting element EL may be disposed in the display area AA and on the substrate 101. The thin-film transistor TFT may include a semiconductor layer 115, a gate electrode 125, and source and drain electrodes 140. The thin-film transistor TFT is a driving transistor (T1 in FIG. 4). For convenience of illustration, only the driving transistor among various thin-film transistors that may be included in the display device 10 is shown. Other thin-film transistors such as the switching transistors may also be included in the display device 10. Further, an example in which the thin-film transistor TFT has a coplanar structure is described. However, the thin-film transistor may be implemented to have other structures such as a staggered structure. The present disclosure is not limited thereto.

The driving transistor may receive the high-potential driving voltage EVDD in response to the data signal supplied to the gate electrode 125 of the driving transistor to control the current amount supplied to the light-emitting element EL to adjust an amount of light emitted from the light-emitting element EL. The driving transistor may supply a constant current based on a voltage charged in a storage capacitor (not shown) to maintain light emission of the light-emitting element EL until a data signal of the next frame is supplied. The high-potential supply line may extend in a parallel manner to the data line.

As shown in FIG. 11, the thin-film transistor TFT includes the semiconductor layer 115 disposed on a first insulating layer 110, the gate electrode 125 overlapping the semiconductor layer 115 while a second insulating layer 120 is interposed therebetween, and the source and drain electrodes 140 formed on a third insulating layer 135 and contacting the semiconductor layer 115.

The semiconductor layer 115 may act as an area where a channel is formed during an operation of the thin-film transistor TFT. The semiconductor layer 115 may be made of an oxide semiconductor, or may be made of various organic semiconductors such as amorphous silicon (a-Si), polycrystalline silicon (poly-Si), or pentacene. The present disclosure is not limited thereto. The semiconductor layer 115 may be formed on the first insulating layer 110. The semiconductor layer 115 may include a channel area, a source area, and a drain area. The channel area may overlap with the gate electrode 125 while the first insulating layer 110 is interposed therebetween. The channel area may be formed between the source and drain electrodes 140. The source area may be electrically connected to the source electrode 140 via a contact hole extending through the second insulating layer 120 and the third insulating layer 135. The drain area may be electrically connected to the drain electrode 140 via a contact hole extending through the second insulating layer 120 and the third insulating layer 135. A buffer layer 105 and the first insulating layer 110 may be disposed between the semiconductor layer 115 and a substrate 101. The buffer layer 105 may delay diffusion of moisture and/or oxygen invading into the substrate 101. The first insulating layer 110 may protect the semiconductor layer 115 and may block various types of defects introduced from the substrate 101.

The uppermost layer of the buffer layer 105 in contact with the first insulating layer 110 may be made of a material having different etching characteristics from those of each of the remaining layers of the buffer layer 105, the first insulating layer 110, the second insulating layer 120 and the third insulating layer 135. The uppermost layer of the buffer layer 105 contacting the first insulating layer 110 may be made of one of silicon nitride ($SiN_x$) and silicon oxide ($SiO_x$). Each of the remaining layers of the buffer layer 105, the first insulating layer 110, the second insulating layer 120, and the third insulating layer 135 may be made of the other of silicon nitride ($SiN_x$) and silicon oxide ($SiO_x$). For example, the uppermost layer of the buffer layer 105 in contact with the first insulating layer 110 may be made of silicon nitride ($SiN_x$), while each of the remaining layers of the buffer layer 105, the first insulating layer 110, the second insulating layer 120, and the third insulating layer 135 may be made of silicon oxide ($SiO_x$). The present disclosure is not limited thereto.

The gate electrode 125 may be formed on the second insulating layer 120 and may overlap the channel area of the semiconductor layer 115 while the second insulating layer 120 is interposed therebetween. The gate electrode 125 may be made of a first conductive material and may be embodied as a single layer or multi-layers made of magnesium (Mg), molybdenum (Mo), aluminum (Al), chromium (Cr), gold (Au), titanium (Ti), nickel (Ni), neodymium (Nd), copper (Cu), or an alloy thereof. The present disclosure is not limited thereto.

The source electrode 140 may be connected to the exposed source area of the semiconductor layer 115 via the contact hole extending through the second insulating layer 120 and the third insulating layer 135. The drain electrode 140 may be opposite to the source electrode 140 and may be connected to the drain area of the semiconductor layer 115 via the contact hole extending through the second insulating layer 120 and the third insulating layer 135. Each of the source and drain electrodes 140 may be made of a second conductive material and may be embodied as a single layer or multi-layers made of molybdenum (Mo), aluminum (Al), chromium (Cr), gold (Au), titanium (Ti), nickel (Ni), neodymium (Nd), copper (Cu), or an alloy thereof. The present disclosure is not limited thereto.

A connection electrode 155 may be disposed between a first middle layer 150 and a second middle layer 160. The connection electrode 155 may be connected to the drain electrode 140 via a connection electrode contact hole 156 extending through a protective film 145 and the first middle layer 150. The connection electrode 155 may be made of a material having low resistivity and identical to or similar to that of the drain electrode 140. The present disclosure is not limited thereto.

Referring to FIG. 11, the light-emitting element EL including the light-emitting layer 172 may be disposed on the second middle layer 160 and a bank layer 165. The light-emitting element 170 may include the anode electrode 171, at least one light-emitting layer 172 formed on the anode electrode 171, and the cathode electrode 173 formed on the light-emitting layer 172.

The anode electrode 171 may be electrically connected to an exposed portion of the connection electrode 155 disposed on the first middle layer 150 and facing the second middle layer 160 via a contact hole extending through the second middle layer 160.

The anode electrode 171 of each pixel is not covered with the bank layer 165. The bank layer 165 may be made of an opaque material (e.g., black) to prevent or at least reduce light interference between adjacent pixels. In this case, the bank layer 165 may include a light-shielding material including at least one of color pigment, organic black, and carbon black. The present disclosure is not limited thereto.

Referring to FIG. 11, the at least one light-emitting layer 172 may be formed on a portion of the anode electrode 171 corresponding to a light-emitting area defined by the bank layer 165. The at least one light-emitting layer 172 may include a hole transport layer, a hole injection layer, a hole blocking layer, a light-emitting layer 172, an electron injection layer, an electron blocking layer, and an electron transport layer on the anode electrode 171. A stacking order of the hole transport layer, the hole injection layer, the hole blocking layer, the light-emitting layer 172, the electron injection layer, the electron blocking layer, and the electron transport layer may be based on a light-emitting direction. In addition, the light-emitting layer 172 may include first and second light-emitting stacks facing each other while a charge generating layer is interposed therebetween. In this case, the light-emitting layer 172 of one of the first and second light-emitting stacks may generate blue light, while the light-emitting layer 172 of the other of the first and second light-emitting stacks may generate yellow-green light, so that white light may be generated from a combination of the first and second light-emitting stacks. The white light generated from the combination of the first and second light-emitting stacks may be incident on a color filter positioned above or below the light-emitting layer 172, such that a color image may be realized. In another example, each light-emitting layer 172 may generate each color light corresponding to each pixel without a separate color filter such that a color image may be rendered. For example, the light-emitting layer 172 of a red (R) pixel emits red light, the light-emitting layer 172 of a green (G) pixel emits green light, and the light-emitting layer 172 of a blue (B) pixel emits blue light.

Referring to FIG. 11, the cathode electrode 173 may be formed to face the anode electrode 171 while the light-emitting layer 172 is disposed therebetween, and may receive the high-potential driving voltage EVDD.

An encapsulation layer 180 may block penetration of external moisture or oxygen into the light-emitting element EL that is vulnerable to external moisture or oxygen. To this end, the encapsulation layer 180 may include at least one inorganic encapsulation layer and at least one organic encapsulation layer. The present disclosure is not limited thereto. In the present disclosure, a structure of the encapsulation layer 180 in which a first encapsulation layer 181, a second encapsulation layer 182, and a third encapsulation layer 183 are sequentially stacked is described by way of example.

The first encapsulation layer 181 is formed on the substrate 101 on which the cathode electrode 173 has been formed. The third encapsulation layer 183 is formed on the substrate 101 on which the second encapsulation layer 182 has been formed. The third encapsulation layer 183 and the first encapsulation layer 181 may surround a top face, a bottom face and a side face of the second encapsulation layer 182. The first encapsulation layer 181 and the third encapsulation layer 183 may minimize or prevent (or at least reduce) penetration of external moisture or oxygen into the light-emitting element EL. Each of the first encapsulation layer 181 and the third encapsulation layer 183 may be made of an inorganic insulating material that may be deposited at a low temperature, such as silicon nitride ($SiN_x$), silicon oxide ($SiO_x$), silicon oxynitride (SiON), or aluminum oxide ($Al_2O_3$). Each of the first encapsulation layer 181 and the third encapsulation layer 183 is deposited in a low temperature atmosphere. Thus, during a deposition process of the first encapsulation layer 181 and the third encapsulation layer 183, the light-emitting element EL which is vulnerable to a high-temperature atmosphere may be prevented from being damaged.

The second encapsulation layer 182 serves as a shock-absorbing layer to relieve a stress between layers due to bending of the display device 10, and may planarize a step between layers. The second encapsulation layer 182 may be made of a non-photosensitive organic insulating material such as acryl resin, epoxy resin, phenolic resin, polyamide resin, polyimide resin, polyethylene or silicon oxycarbon (SiOC) or a photosensitive organic insulating material such as photoacryl. The present disclosure is not limited thereto. When the second encapsulation layer 182 is formed using an inkjet method, a dam DAM may be disposed to prevent or at least reduce the second encapsulation layer 182 in a liquid state from spreading to an edge of the substrate 101. The dam DAM may be closer to the edge of the substrate 101 than the second encapsulation layer 182 may be. The dam DAM may prevent or at least reduce the second encapsulation layer 182 in the liquid state from spreading to a pad area where a conductive pad disposed at the outermost side of the substrate 101 is disposed.

The dam DAM is designed to prevent or at least reduce diffusion of the second encapsulation layer 182. However, when the second encapsulation layer 182 overflows the dam DAM during a process, the second encapsulation layer 182 as an organic layer may be exposed to an outside, so that moisture or the like may invade the light-emitting element. Therefore, to prevent or at least reduce the invasion, at least ten dams DAM may be stacked.

Referring to FIG. 11, the dam DAM may be disposed on the protective film 145 and in the non-display area NA.

Further, the dam DAM, and the first middle layer 150 and the second middle layer 160 may be formed simultaneously. The first middle layer 150, and a lower layer of the dam DAM may be formed simultaneously. The second middle layer 160, and an upper layer of the dam DAM may be formed simultaneously. Thus, the dam DAM may have a double layer structure.

Accordingly, the dam DAM may be made of the same material as that of each of the first middle layer 150 and the second middle layer 160. However, the present disclosure is not limited thereto.

Referring to FIG. 8, the dam DAM may overlap the low-potential driving power line VSS. For example, the low-potential driving power line VSS may be formed in a layer under the dam DAM and in the non-display area NA.

The low-potential driving power line VSS and a gate driver 300 in a form of a gate in panel (GIP) may surround a periphery of the display panel. The low-potential driving power line VSS may be located outwardly of the gate driver 300. Further, the low-potential driving power line VSS may be connected to the anode electrode 171 to apply a common voltage thereto. The gate driver 300 is simply illustrated in plan and cross-sectional views. However, the gate driver 300 may be configured using a thin-film transistor TFT having the same structure as that of the thin-film transistor TFT of the display area AA.

Referring to FIG. 11, the low-potential driving power line VSS is disposed outwardly of the gate driver 300. The low-potential driving power line VSS is disposed outwardly of the gate driver 300 and surrounds the display area AA. The low-potential driving power line VSS may be made of the same material as that of each of the source and drain electrodes 140 of the thin-film transistor TFT. The present disclosure is not limited thereto. For example, the low-potential driving power line VSS may be made of the same material as that of the gate electrode 125.

Further, the low-potential driving power line VSS may be electrically connected to the anode electrode 171. The low-potential driving power line VSS may supply the low-potential driving voltage EVSS to the plurality of pixels in the display area AA.

A touch layer 190 may be disposed on the encapsulation layer 180. In the touch layer 190, a touch buffer layer 191 may be positioned between a touch sensor metal, including touch electrode connection lines 192 and 194 and touch electrodes 195 and 196, and the cathode electrode 173 of the light-emitting element EL. In some embodiments, the touch buffer layer 191 may be a touch buffer film.

The touch buffer layer 191 may prevent or at least reduce chemical (developer, etchant, etc.) used in a manufacturing process of the touch sensor metal disposed on the touch buffer layer 191 or moisture from the outside from invading the light-emitting layer 172 including an organic material. Accordingly, the touch buffer layer 191 may prevent or at least reduce damage to the light-emitting layer 172 which is vulnerable to the chemicals or moisture.

The touch buffer layer 191 may be made of an organic insulating material that can be formed at a low temperature below or equal to a certain temperature (100 degrees Celsius) to prevent or at least reduce damage to the light-emitting layer 172 including the organic material vulnerable to a high temperature, and that has a low dielectric constant of 1 to 3. For example, the touch buffer layer 191 may be made of an acryl-based, epoxy-based, or siloxane-based material. The touch buffer layer 191 made of the organic insulating material and having planarization performance may prevent or at least reduce damage to the encapsulation layer 180 and fracture of the touch sensor metal formed on the touch buffer layer 191 due to bending of the organic light-emitting display device.

According to a mutual-capacitance-based touch sensor structure, the touch electrodes 195 and 196 may be disposed on the touch buffer layer 191, and the touch electrodes 195 and 196 may be disposed to intersect each other.

The touch electrode connection lines 192 and 194 may electrically connect the touch electrodes 195 and 196 to each other. The touch electrode connection lines 192 and 194 and the touch electrodes 195 and 196 may be positioned on different layers while the touch insulating film 193 is interposed therebetween.

The touch electrode connection lines 192 and 194 may overlap the bank layer 165, thereby preventing or at least reducing a likelihood of an aperture ratio from being lowered.

In one example, a portion of the touch electrode connection line 192 may extend along upper and side surfaces of the encapsulation layer 180 and upper and side surfaces of the dam DAM and then may be electrically connected to a touch driver circuit (not shown) via a touch pad 198. Thus, the touch electrodes 195 and 196 may be electrically connected to the touch driver circuit.

The portion of the touch electrode connection line 192 may receive a touch driving signal from the touch driver circuit and transmit the same to the touch electrodes 195 and 196, and may receive a touch sensing signal from the touch electrodes 195 and 196 and may transmit the same to the touch driver circuit.

A touch protective film 197 may be disposed on the touch electrodes 195 and 196. In the drawing, it is shown that the touch protective film 197 is disposed only on the touch electrodes 195 and 196. However, the present disclosure is not limited thereto. The touch protective film 197 may extend to an inner end or an outer end of the dam DAM and thus may also be disposed on the touch electrode connection line 192.

Further, a color filter (not shown) may be further disposed on the encapsulation layer 180, and the color filter may be positioned on the touch layer 190 or between the encapsulation layer 180 and the touch layer 190.

In FIG. 11, a lock signal line disposed between and connected to the source drivers and delivering the lock signal LOCK is not shown. However, the lock signal line may be disposed in the third insulating layer 135 and adjacent to the low-potential power supply line VSS. However, the present disclosure is not limited thereto. The lock signal line may be disposed in another layer such that that lock signal line does not interfere with other signal lines.

Figure 12:
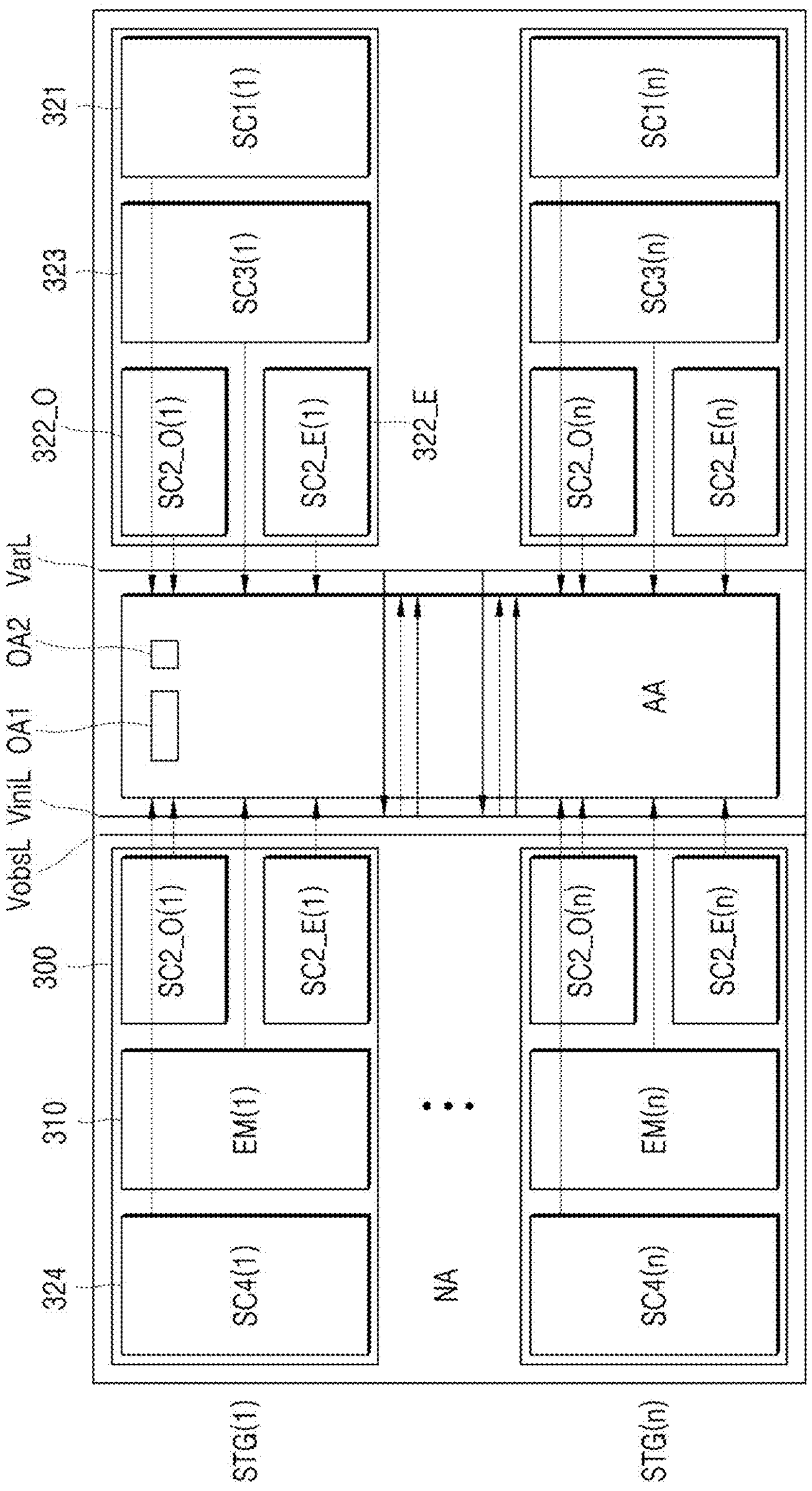
FIG. 12 shows a block diagram of a gate driver of a display device according to one embodiment.

FIG. 12 is a diagram of a configuration of a gate driver in a display device according to an embodiment.

Referring to FIG. 12, the gate driver 300 includes a light-emission control signal driver 310 and a scan driver 320. The scan driver 320 may include a first scan driver to a fourth scan driver 321, 322, 333, and 334. Further, the second scan driver 322 may be composed of an odd-numbered second scan driver 322_O and an even-numbered second scan driver 322_E.

The gate driver 300 may include shift registers which may be respectively disposed on both opposing sides of the display area AA symmetrically. Further, in the gate driver 300, the shift register on one side of the display area AA may be configured to include the second scan drivers 322_O and 322_E, the fourth scan driver 324 and the light-emission control signal driver 310. The shift register on the other side of the display area AA may be configured to include the first scan driver 321, the second scan drivers 322_O and 322_E, and the third scan driver 323. However, the present disclosure is not limited thereto, and the light-emission control signal driver 310 and the first to fourth scan drivers 321, 322, 323, and 324 may be arranged in a manner varying according to embodiments.

Each of stages STG(1) to STG(n) of the shift register may include each of first scan signal generators SC1(1) to SC1(*n*), each of second scan signal generators SC2_O(1) to SC2_O(n) and SC2_E(1) to SC2_E(n), each of third scan signal generators SC3(1) to SC3(*n*), each of fourth scan signal generators SC4(1) to SC4(*n*) and each of light-emission control signal generators EM(1) to EM(n).

The first scan signal generators SC1(*n*) to SC1(*n*) respectively output first scan signals SC1(*n*) to SC1(*n*) via a first scan line SCL1 of the display panel 400. The second scan signal generators SC2(1) to SC2(*n*) respectively output second scan signals SC2(1) to SC2(*n*) via a second scan line SCL2 of the display panel 400. The third scan signal generators SC3(1) to SC3(*n*) respectively output third scan signals SC3(1) to SC3(*n*) via a third scan line SCL3 of display panel 400. The fourth scan signal generators SC4(1)

to SC4($n$) respectively output fourth scan signals SC4(1) to SC4($n$) via fourth scan line SCL4 of the display panel 400. The light-emission control signal generators EM(1) to EM(n) respectively output light-emission control signals EM(1) to EM(n) via a light-emission control line EML of the display panel 400.

The first scan signals SC1($n$) to SC1($n$) may be used as signals for operating an A-th transistor included in the pixel circuit such as a compensation transistor. The second scan signals SC2(1) to SC2($n$) may be used as signals for operating a B-th transistor included in the pixel circuit, such as a data supply transistor. The third scan signals SC3(1) to SC3($n$) may be used as signals for operating a C-th transistor included in the pixel circuit, such as a bias transistor. The fourth scan signals SC4(1) to SC4($n$) may be used as signals for operating a D-th transistor included in the pixel circuit, such as an initialization transistor. The light-emission control signals EM(1) to EM(n) may be used as signals for operating an E-th transistor included in the pixel circuit, such as a light-emission control transistor. For example, when light-emission control transistors of pixels are controlled using the light-emission control signals EM(1) to EM(n), an emission time of the light-emitting element is varied.

Referring to FIG. 12, a bias voltage bus line VobsL, a first initialization voltage bus line VarL, and a second initialization voltage bus line ViniL may be disposed between and connected to the gate driver 300 and the display area AA.

The bias voltage bus line VobsL, the first initialization voltage bus line VarL, and the second initialization voltage bus line ViniL may respectively a supply bias voltage Vobs, a first initialization voltage Var, and a second initialization voltage Vini from a power supply 500 to the pixel circuit.

In the drawing, it is shown that the bias voltage bus line VobsL, the first initialization voltage bus line VarL, and the second initialization voltage bus line ViniL are disposed on only one of a left or right side of the display area AA. However, the present disclosure is not limited thereto. The bias voltage bus line VobsL, the first initialization voltage bus line VarL, and the second initialization voltage bus line ViniL may be disposed on each of both opposing sides of the display area AA. When the bias voltage bus line VobsL, the first initialization voltage bus line VarL, and the second initialization voltage bus line ViniL is disposed on one of both opposing sides of the display area AA, one side is not limited to the left or right side.

Referring to FIG. 12, at least one optical area OA1 and OA2 may be disposed in the display area AA.

The at least one optical area OA1 and OA2 may be positioned so as to overlap at least one optical and electronic device, such as a capturing device such as a camera (an image sensor), and a detection sensor such as a proximity sensor and a luminance sensor.

For operation of the optical electronic device, the at least one optical area OA1 and OA2 may have a light transmissive structure and thus may have a transmittance equal to or greater than a predefined value. In other words, the number of pixels P per unit area in at least one optical area OA1 and OA2 may be smaller than the number of pixels P per unit area in a general area of the display area AA except for the at least one optical area OA1 and OA2. That is, a resolution of at least one optical area OA1 and OA2 may be lower than that of the general area of the display area AA.

The light transmissive structure of the at least one optical area OA1 and OA2 may be formed by patterning a cathode electrode in an area where the pixel P is not disposed. At this time, a portion of the cathode electrode to be patterned may be removed using a laser. Alternatively, the cathode electrode may be selectively formed so as to be patterned using a material such as a cathode deposition prevention layer.

Alternatively, the light transmissive structure of the at least one optical area OA1 and OA2 may be formed by forming the light-emitting element EL and the pixel circuit in a separated manner in the pixel P. In other words, the light-emitting element EL of the pixel P may be positioned on the at least one optical area OA1 and OA2, while a plurality of transistors TFT constituting the pixel circuit may be disposed around the at least one optical area OA1 and OA2, and the light-emitting element EL and the pixel circuit may be electrically connected to each other via a transparent metal layer.

Figure 13:
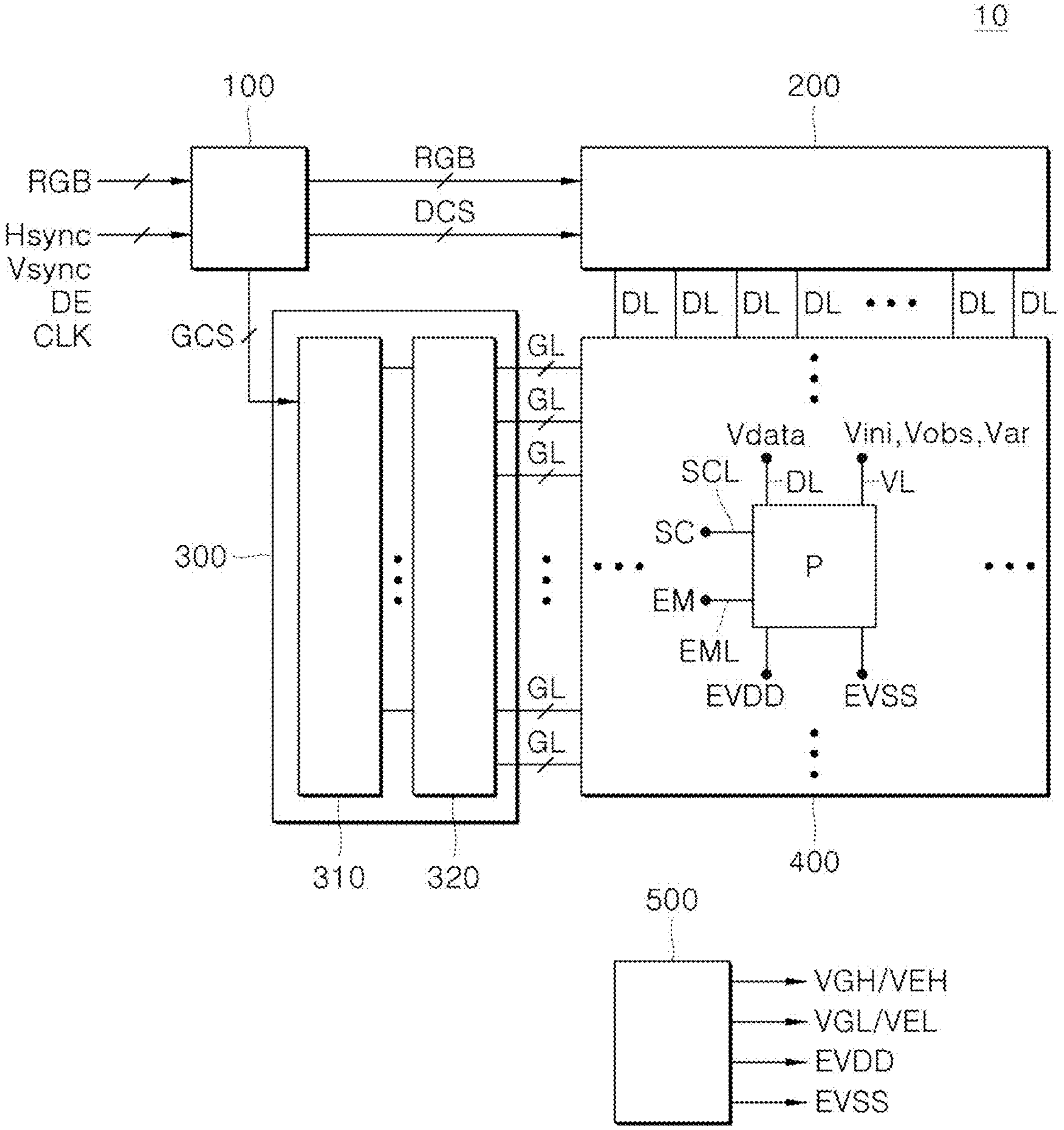
FIG. 13 is a block diagram schematically showing a display device according to one embodiment of the present disclosure.

FIG. 13 is a block diagram schematically showing a display device according to one embodiment of the present disclosure.

Referring to FIG. 13, the display device 10 includes the display panel 400 including a plurality of pixels P, a timing controller 100, the gate driver 300 that supplies a gate signal to each of the plurality of pixels P, a data driver 200 that supplies a data signal to each of the plurality of pixels P, and the power supply 500 supplying power necessary for operating each of the plurality of pixels P.

The display panel 400 includes the display area (AA in FIG. 2) where the pixel P is positioned, and the non-display area (NA in FIG. 2) surrounding the display area AA. In the non-display area, the gate driver 300 and the data driver 200 are disposed.

In the display panel 400, a plurality of gate lines GL and a plurality of data lines DL intersect each other, and each of the plurality of pixels P is connected to the gate line GL and the data line DL. Specifically, one pixel P receives the gate signal from the gate driver 300 via the gate line GL, receives the data signal from the data driver 200 via the data line DL, and receives the high-potential driving voltage EVDD and the low-potential driving voltage EVSS from the power supply 500.

In this regard, the gate line GL supplies the scan signal SC and the light-emission control signal EM, and the data line DL supplies the data voltage Vdata. Further, according to various embodiments, the gate line GL may include a plurality of scan lines SCL supplying the scan signal SC and the light-emission control signal line EML supplying the light-emission control signal EM. Further, the plurality of pixels P may additionally include a power line VL and may receive the bias voltage Vobs and the initialization voltages Var and Vini via the power line VL.

Further, as shown in FIG. 2, each pixel P includes the light-emitting element EL and the pixel circuit that controls the operation of the light-emitting element EL. In this regard, the light-emitting element EL includes the anode electrode 171, the cathode electrode 173, and the light-emitting layer 172 between the anode electrode 171 and the cathode electrode 173.

The pixel circuit includes a plurality of switching elements, a driving element, and a capacitor. In this regard, each of the switching element and the driving element may be embodied as a thin-film transistor. In the pixel circuit, the driving element controls an amount of the current supplied to the light-emitting element EL based on the data voltage to adjust an amount of light emitted from the light-emitting element EL. Further, the plurality of switching elements may receive the scan signal SC supplied via the plurality of scan lines SCL and the light-emission control signal EM supplied via the light-emission control line EML and may control the operation of the pixel circuit based on the received signals SC and EM.

The display panel 400 may be implemented as a non-transmissive type display panel or a transmissive type display panel. The transmissive display panel may be applied to a transparent display device in which an image is displayed on a screen and a real object of a background is visible to a viewer. The display panel 400 may be manufactured as a flexible display panel. The flexible display panel may be implemented as an OLED panel using a plastic substrate.

The pixels P may be classified into a red pixel, a green pixel, and a blue pixel for color rendering. The pixel P may further include a white pixel. Each of the pixels P includes the pixel circuit.

Touch sensors may be disposed on the display panel 400. Touch input may be sensed using separate touch sensors or through the pixels. The touch sensors may be disposed on the screen of the display panel in an on-cell manner or an add on manner or may be embedded in the display panel 400 in an in-cell manner.

The timing controller 100 processes image data RGB input from an external device based on the size and the resolution of the display panel 400 and supplies the processed image data to the data driver 200. The timing controller 100 generates a gate control signal GCS and a data control signal DCS using sync signals input from an external source, for example, a dot clock signal CLK, a data enable signal DE, a horizontal sync signal Hsync, and a vertical sync signal Vsync. The timing controller 100 supplies the generated gate control signal GCS and data control signal DCS to the gate driver 300 and the data driver 200, respectively to control the gate driver 300 and the data driver 200.

The timing controller 100 may be configured to be coupled to various processors, for example, a microprocessor, a mobile processor, an application processor, etc., depending on a type of a device on which the controller is mounted.

A host system may be any one of a television (TV) system, a set top box, a navigation system, a personal computer (PC), a home theater system, a mobile device, a wearable device, and a vehicle system.

The timing controller 100 multiplies an input frame frequency by i and controls an operation timing of a display panel driver using a frame frequency=the input frame frequency×i (i is a positive integer greater than 0) Hz. The input frame frequency is 60 Hz in the National Television Standards Committee (NTSC) scheme and is 50 Hz in the Phase-Alternating Line (PAL) scheme.

The timing controller 100 generates a signal so that the pixel may operate at various refresh rates. That is, the timing controller 100 generates operation-related signals such that the pixel may operate in a Variable Refresh Rate (VRR) mode or a refresh rate thereof may be switchable between a first refresh rate and the second refresh rate. For example, the timing controller 100 may simply change a rate of a clock signal, may generate a synchronization signal to generate a horizontal blank or a vertical blank, or may operate the gate driver 300 in a mask manner such that the pixel P may operate at various refresh rates.

The timing controller 100 generates, based on the timing signals Vsync, Hsync, and DE received from the host system, the gate control signal GSC for controlling the operation timing of the gate driver 300, and the data control signal DSC for controlling the operation timing of the data driver 200. The timing controller 100 controls an operation timing of the display panel driver to synchronize the gate driver 300 and the data driver 200 with each other.

A level shifter (not shown) converts a voltage level of the gate control signal GSC output from the timing controller 100 into a gate on voltage VGL and VEL and a gate off voltage VGH and VEH which in turn are supplied to the gate driver 300. The level shifter converts a low level voltage of the gate control signal GSC to a gate low voltage VGL, and converts a high level voltage of the gate control signal GSC to a gate high voltage VGH. The gate control signal GSC includes a start pulse and a shift clock.

The gate driver 300 supplies the scan signal SC to the gate line GL according to the gate control signal GCS supplied from the timing controller 100. The gate driver 300 may be disposed at one side or each of both opposing sides of the display panel 400 and in a GIP (Gate In Panel) manner.

The gate driver 300 sequentially outputs the gate signal to the plurality of gate lines GL under control of the timing controller 100. The gate driver 300 may shift the gate signal using a shift register and sequentially supply the shifted gate signal to the gate lines GL.

The gate signal may include the scan signal SC and the light-emission control signal EM in an organic light-emitting display device. The scan signal SC includes a scan pulse swinging between the gate on voltage VGL and the gate off voltage VGH. The light-emission control signal may include a light-emission control signal pulse that swings between the gate on voltage VEL and the gate off voltage VEH.

The scan pulse is synchronized with the data voltage Vdata to select pixels of a line to which data is to be written. The light-emission control signal defines a light-emitting time of each of pixels.

The gate driver 300 may include the light-emission control signal driver 310 and the at least one scan driver 320.

The light-emission control signal driver 310 outputs the light-emission control signal pulse in response to the start pulse and the shift clock received from the timing controller 100 and sequentially shifts the light-emission control signal pulse according to the shift clock.

Each of the at least one scan driver 320 outputs the scan pulse in response to the start pulse and the shift clock received from the timing controller 100, and shifts the scan pulse according to a shift clock timing.

The data driver 200 converts the image data RGB into the data voltage Vdata according to the data control signal DCS supplied from the timing controller 100, and supplies the converted data voltage Vdata to the pixel via the data line DL.

In FIG. 13, it is illustrated that one data driver 200 is disposed at one side of the display panel 400. However, the number and a position of the data drivers 200 are not limited thereto.

That is, the data driver 200 may be embodied as a plurality of integrated circuits (ICs) which may be disposed at one side of the display panel 400 and may be separately arranged along the one side.

The power supply 500 generates direct current (DC) power necessary for operating a pixel array of the display panel 400 and the display panel driver using a DC-DC converter. The DC-DC converter may include a charge pump, a regulator, a buck converter, a boost converter, etc. The power supply 500 receives a DC input voltage applied from the host system (not shown) and generates DC voltages such as the gate on voltage VGL and VEL, the gate off voltage VGH and VEH, the high-potential driving voltage EVDD, the low-potential driving voltage EVSS, etc. The gate on voltage VGL and VEL and the gate off voltage VGH and VEH are supplied to the level shifter (not shown) and the gate driver 300. Each of the high-potential driving voltage EVDD and the low-potential driving voltage EVSS is commonly supplied to the pixels.

A first aspect of the present disclosure provides a display device comprising: a display panel; and a plurality of source drivers configured to convert image data into data voltage and provide the data voltage to the display panel, wherein each of the plurality of source drivers includes a reception circuit configured to reconstruct at least one of the image data, control data, and a clock from a data packet received from a timing controller, wherein in a VRR (Variable Refresh Rate) mode operation, the display device is configured to activate the reception circuit during a refresh frame and to deactivate the reception circuit during a skip frame.

In one implementation of the display device, during the skip frame, each of the plurality of source drivers is configured to maintain a level of the data voltage at a level of the data voltage output at a last time during the refresh frame.

In one implementation of the display device, the timing controller includes a transmission circuit configured to generate the data packet including at least one of the image data, the control data, and the clock and to transmit the data packet to the plurality of source drivers.

In one implementation of the display device, in the VRR mode operation, the display device is configured to activate the transmission circuit during the refresh frame and to deactivate the transmission circuit during the skip frame.

In one implementation of the display device, the display device is configured to switch a lock signal indicating an output stable state to a low logic level during the skip frame.

In one implementation of the display device, each of the transmission circuit and the reception circuit enters a sleep mode in response to the lock signal having the low logic level during the skip frame.

In one implementation of the display device, the display device is configured to count a time upon entering the skip frame, and then to activate the transmission circuit when the time has reached a reference time.

In one implementation of the display device, the transmission circuit is configured to transmit the data packet including the clock to the reception circuit to activate the reception circuit.

In one implementation of the display device, the reception circuit is configured to: reconstruct the clock from the data packet; and when a phase and a frequency of an internal clock thereof are fixed via clock training, switch the lock signal to a high logic level and transmit the lock signal to the transmission circuit.

In one implementation of the display device, the transmission circuit is configured to enter the refresh frame in response to reception of the lock signal having the high logic level.

In one implementation of the display device, upon entering the refresh frame, the transmission circuit is configured to include the image data, the control data, and the clock into the data packet and to transmit the data packet to the reception circuit.

A second aspect of the present disclosure provides a method for operating a display device, wherein the display device includes: a display panel; and a plurality of source drivers configured to convert image data into data voltage and provide the data voltage to the display panel, wherein each of the plurality of source drivers includes a reception circuit configured to reconstruct at least one of the image data, control data, and a clock from a data packet received from a timing controller, wherein the method comprises: in a VRR (Variable Refresh Rate) mode operation, activating the reception circuit during a refresh frame; and deactivating the reception circuit during a skip frame.

In one implementation of the method, deactivating the reception circuit during the skip frame further includes, during the skip frame, outputting the data voltage while a level of the data voltage is maintained at a level of the data voltage output at a last time during the refresh frame.

In one implementation of the method, the timing controller includes a transmission circuit configured to generate the data packet including at least one of the image data, the control data, and the clock and to transmit the data packet to the plurality of source drivers, wherein the method further comprises, in the VRR mode operation, deactivating the transmission circuit during the skip frame.

In one implementation of the method, deactivating the reception circuit during the skip frame further includes switching a lock signal to a low logic level or disabling outputting of the lock signal during the skip frame, wherein the lock signal indicates an output stable state between the timing controller and the source drivers.

In one implementation of the method, deactivating the reception circuit during the skip frame further includes allowing the reception circuit to enter a sleep mode in response to the lock signal having the low logic level during the skip frame, wherein deactivating the transmission circuit during the skip frame further includes allowing the transmission circuit to enter a sleep mode in response to the lock signal having the low logic level during the skip frame.

In one implementation of the method, the method further comprises counting a time upon entering the skip frame, and activating the transmission circuit when the time has reached a reference time.

In one implementation of the method, the method further comprises transmitting the data packet including the clock to the reception circuit to activate the reception circuit.

In one implementation of the method, the method further comprises: reconstructing the clock from the data packet; and when a phase and a frequency of an internal clock thereof are fixed via clock training, switching the lock signal to a high logic level, and transmitting the lock signal to the transmission circuit.

In one implementation of the method, the method further comprises allowing the transmission circuit to enter the refresh frame in response to reception of the lock signal having the high logic level received from the source driver.

A third aspect of the present disclosure provides a method for operating a display device, the display device including a display panel, the method comprising: converting image data into data voltage, and providing the data voltage to the display panel; and in a Variable Refresh Rate mode operation, enabling during a refresh frame, and disabling during a skip frame, reconstruction of at least one of the image data, control data, and a clock from a data packet received from a timing controller.

In one implementation of the method, disabling the reconstruction during the skip frame further includes: during the skip frame, outputting the data voltage while a level of the data voltage is maintained at a level of the data voltage output at a last time during the refresh frame.

In one implementation of the method, the method further comprises: in the Variable Refresh Rate mode operation, enabling during the refresh frame, and disabling during the skip frame, transmission of the data packet including at least one of the image data, the control data, and the clock from the timing controller.

The display device and the method of operating the same according to the embodiments may maximize the power consumption reduction of the digital logic circuit during the low-speed operation.

Further, maximizing the power consumption reduction allows the low-power operation.

Although the embodiments of the present disclosure have been described in more detail with reference to the accompanying drawings, the present disclosure is not necessarily limited to these embodiments, and may be modified in various manners within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects.

What is claimed is:

1. A display device comprising:
a display panel; and
a plurality of source drivers configured to convert image data into a data voltage and provide the data voltage to the display panel,
wherein each of the plurality of source drivers includes a reception circuit configured to reconstruct at least one of the image data, control data, or a clock from a data packet received from a transmission circuit of a timing controller, and
a source output circuit configured to output the data voltage to the display panel,
wherein the display device includes a lock signal indicating an output stable state between the timing controller and the plurality of source drivers,
wherein the transmission circuit and the reception circuit are configured to be disabled in response to the lock signal being deactivated during a skip frame in a variable refresh rate mode operation, wherein the variable refresh rate mode operates at a first refresh rate during a first period, and a second refresh rate during a second period, the second refresh rate different from the first refresh rate,
wherein during the skip frame of the second period, the reception circuit of a first source driver in the plurality of source drivers is configured to be deactivated in response to a first lock signal from the transmission circuit, and provide a second lock signal to an adjacent second source driver in the plurality of source drivers, and the reception circuit of the adjacent second source driver is configured to be deactivated in response to the second lock signal during the skip frame, and
wherein, while the transmission circuit and the reception circuit are disabled during the skip frame, the source output circuit is configured to maintain and output a data voltage corresponding to image data latched at a last time during a refresh frame.

2. The display device of claim 1, wherein the timing controller includes the transmission circuit configured to:
generate the data packet including at least one of the image data, the control data, and the clock, and
transmit the data packet to the plurality of source drivers.

3. The display device of claim 1, wherein the transmission circuit and the reception circuit are configured to enter a sleep mode in response to the lock signal being deactivated during the skip frame.

4. The display device of claim 1, wherein the display device is configured to:
count a time upon entering the skip frame, and
activate the transmission circuit in response to the counted time reaching a reference time.

5. The display device of claim 4, wherein the transmission circuit is configured to transmit a data packet including at least a clock to the reception circuit when activated.

6. The display device of claim 5, wherein the reception circuit is configured to:
reconstruct the clock from the data packet; and
activate the lock signal in response to a phase and a frequency of an internal clock being fixed via clock training.

7. The display device of claim 6, wherein the transmission circuit is configured to enter the refresh frame in response to the activated the lock signal.

8. The display device of claim 7, wherein upon entering the refresh frame, the transmission circuit is configured to transmit the data packet including the image data, the control data, and the clock to the reception circuit.

9. A method for operating a display device that includes a display panel and a plurality of source drivers configured to convert image data into a data voltage and provide the data voltage to the display panel,
wherein each of the plurality of source drivers includes a reception circuit configured to reconstruct at least one of the image data, control data, and a clock from a data packet received from a timing controller,
the method comprises:
providing a lock signal indicating an output stable state between the timing controller and the plurality of source drivers;
deactivating a transmission circuit of the timing controller and the reception circuit in response to the lock signal being deactivated during a skip frame in a variable refresh rate mode operation, wherein the variable refresh rate mode operates at a first refresh rate during a first period, and a second refresh rate during a second period, the second refresh rate different from the first refresh rate,
wherein during the skip frame of the second period, the reception circuit of a first source driver in the plurality of source drivers is configured to be deactivated in response to a first lock signal from the transmission circuit, and provide a second lock signal to an adjacent second source driver in the plurality of source drivers, and the reception circuit of the adjacent second source driver is configured to be deactivated in response to the second lock signal during the skip frame; and
while the transmission circuit and the reception circuit are deactivated during the skip frame, maintaining and outputting, by a source output circuit of each source driver, a data voltage corresponding to image data latched at a last time during a refresh frame.

10. The method of claim 9, wherein the method further comprises causing the transmission circuit and the reception circuit to enter a sleep mode in response to the lock signal being deactivated during the skip frame.

11. The method of claim 9, wherein the method further comprises counting a time upon entering the skip frame, and activating the transmission circuit in response to the counted time reaching a reference time.

12. The method of claim 11, wherein the method further comprises transmitting, by the transmission circuit, a data packet including at least a clock to the reception circuit when the transmission circuit is activated.

13. The method of claim 12, wherein the method further comprises:

reconstructing the clock from the data packet; and activating the lock signal in response to a phase and a frequency of an internal clock being fixed via clock training.

14. The method of claim 13, wherein the method further comprises causing the transmission circuit to enter the refresh frame in response to the activated lock signal.

15. A method for operating a display device, the display device including a display panel, the method comprising:

converting image data into data voltage, and providing the data voltage to the display panel; and providing a lock signal indicating an output stable state between a timing controller and a source driver;

deactivating reconstruction of at least one of image data, control data, and a clock from a data packet received from the timing controller in response to the lock signal being deactivated during a skip frame in a variable refresh rate mode operation, wherein the variable refresh rate mode operates at a first refresh rate during a first period, and a second refresh rate during a second period, the second refresh rate different from the first refresh rate, wherein during the skip frame of the second period, the reception circuit of a first source driver in the plurality of source drivers is configured to be deactivated in response to a first lock signal from the transmission circuit, and provide a second lock signal to an adjacent second source driver in the plurality of source drivers, and the reception circuit of the adjacent second source driver is configured to be deactivated in response to the second lock signal during the skip frame; and while the reconstruction is deactivated during the skip frame, maintaining and outputting the data voltage corresponding to image data latched at a last time during a refresh frame.

16. The method of claim 15, wherein maintaining and outputting the data voltage comprises:

outputting the data voltage at a level corresponding to the data voltage latched at a last refresh frame while reconstruction of the image data, the control data, and the clock is deactivated.

* * * * *